United States Patent [19]

Spence

[11] Patent Number: 4,675,684

[45] Date of Patent: Jun. 23, 1987

[54] DISTANCE MEASURING RECEIVER SYSTEM AND METHOD

[75] Inventor: Lewis C. Spence, Jupiter, Fla.

[73] Assignee: John P. Ohl, Palm Beach, Fla. ; a part interest

[21] Appl. No.: 910,258

[22] Filed: Sep. 19, 1986

Related U.S. Application Data

[63] Continuation of Ser. No. 543,602, Oct. 20, 1983.

[51] Int. Cl.⁴ .............................................. G01S 1/30
[52] U.S. Cl. .................................. 342/394; 342/442; 342/458
[58] Field of Search ................ 342/394, 396, 442, 458

[56] References Cited

U.S. PATENT DOCUMENTS

| | | |
|---|---|---|
| 2,924,820 | 2/1960 | Dishal et al. . |
| 2,947,985 | 8/1960 | Cooley . |
| 3,325,811 | 6/1967 | Earp . |
| 3,397,400 | 8/1968 | Maass et al. . |
| 3,613,095 | 10/1971 | Elwood . |
| 3,696,427 | 10/1972 | Nard . |
| 3,705,403 | 12/1972 | Hughes . |
| 3,755,816 | 8/1973 | Kratzer . |
| 3,763,492 | 10/1973 | Easton . |
| 3,774,211 | 11/1973 | Nard et al. . |
| 3,797,015 | 3/1974 | Elwood . |
| 3,816,832 | 6/1974 | Elwood . |
| 3,839,719 | 10/1974 | Elwood . |
| 3,870,998 | 3/1975 | Dewey et al. . |
| 3,916,410 | 10/1975 | Elwood . |
| 3,967,277 | 6/1976 | Hastings et al. ................... 342/394 |
| 4,283,726 | 8/1981 | Spence . |

*Primary Examiner*—Theodore M. Blum
*Attorney, Agent, or Firm*—Saidman, Sterne, Kessler & Goldstein

[57] ABSTRACT

A distance measuring receiver system and method for determining the distance of a receiving station from a transmitting station, which provides the distance information by the reception and processing of a pair of signals (preferably continuous wave carrier) transmitted by the transmitting station. The filter subsystem 106 supplies the upper signal to the first channel 501 and the lower signal to the second channel 502 of a lane expansion subsystem 108, which produces a plurality of difference frequency signals 113, 115, 117, 119 (of preselected multiples) in accordance with the upper and lower signals. A reference subsystem 112 in accordance with the oscillator signal 121 supplies a plurality of reference signals 127, 129, 131, 133 (having frequencies equal to the frequencies corresponding to difference frequency signals). By comparing the phase of corresponding difference frequency and reference signals, phase comparator subsystem 114 produces a plurality of measurement lanes of different lengths, which allow the present invention to zero in on the position of the receiving station. Substantial elimination of phase error to each signal caused by signal processing is achieved by the present invention.

1 Claim, 11 Drawing Figures

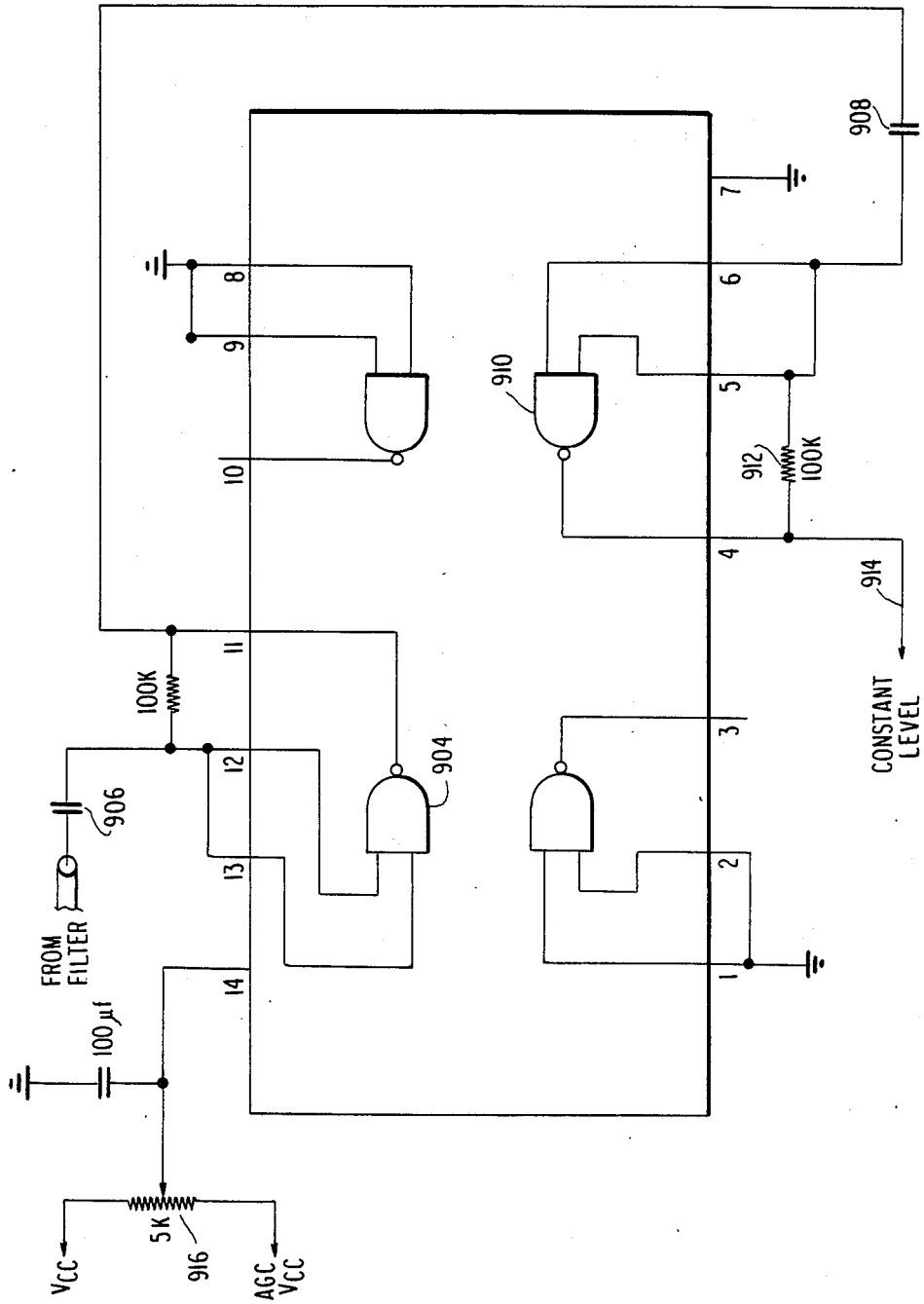

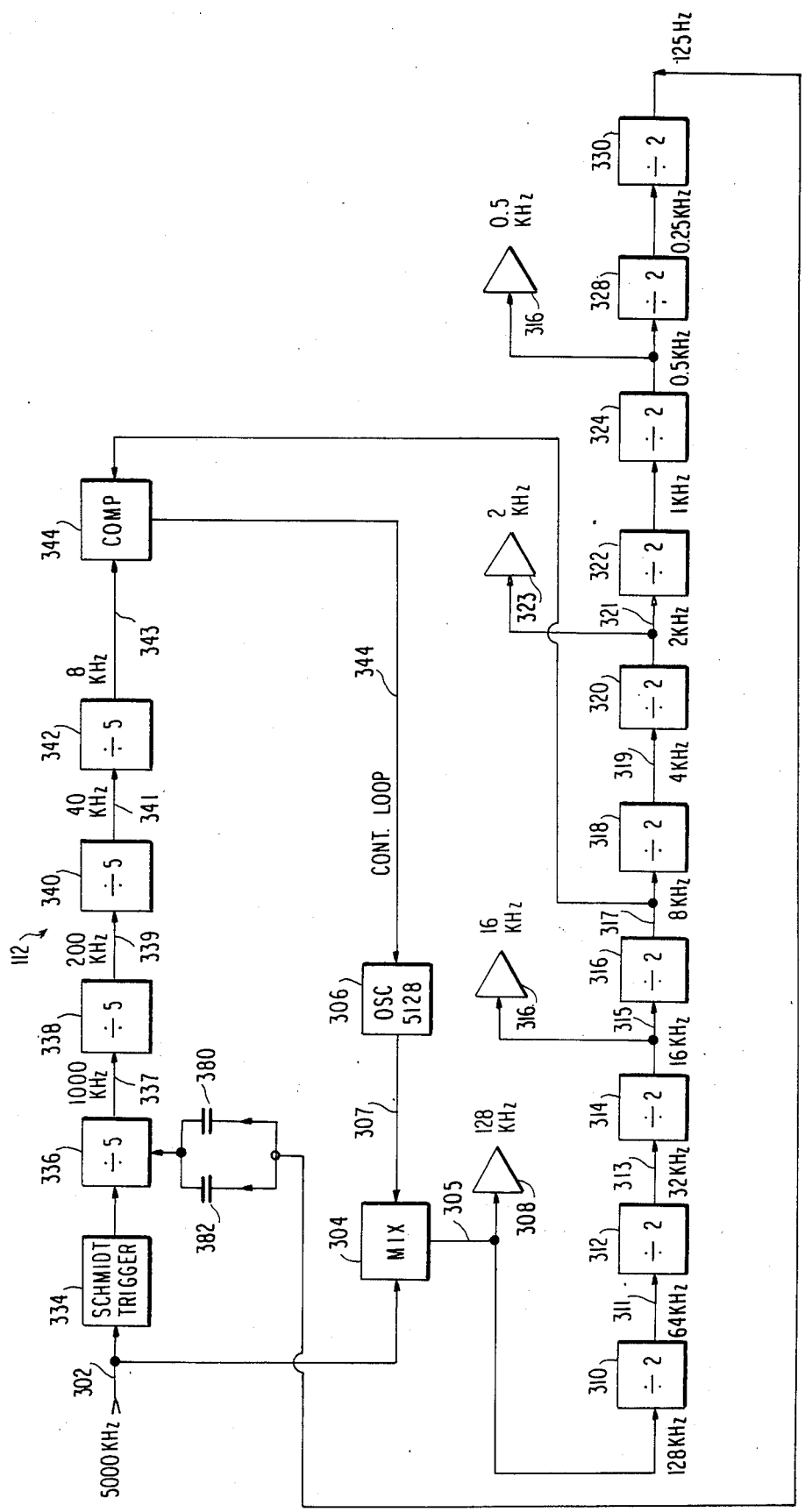

DISTANCE MEASURING RECEIVER SYSTEM AND METHOD

This application is a continuation of application Ser. No. 543,602, filed 10/20/83.

BACKGROUND OF THE INVENTION

1. Field of Use

The present invention relates generally to electronic distance and position measuring systems and methods, and more particularly, to receivers providing electronic distance or position measuring capability where the distance or position is determined at the receiver by a comparison between the phase of a received pair of signals and of a reference signal of the same frequency.

2. Description of the Related Art

Many different types of distance or position measuring systems have been developed. Depending on the field application, the accuracy required, and the distance or position of the receiving station from the transmitting station(s), radio or optical (such as laser) techniques are utilized. Satellites are being used as relay or as transmitting stations in some systems.

The demand for improved systems is due to perceived public welfare, military, economic and other needs. For example, there is a public welfare need to be able to determine the location of in-flight aircraft. Radar and other electronic tracking systems are employed to provide such capability. Accurately locating surface and subsurface vessels in water bodies is necessary to prevent collisions and to provide navigation. Obviously, as the number of aircraft and vessels increase, the capability of such systems must increase.

There are many military applications for position or distance measuring systems. For example, the ability to determine the presence and location of "friendly" aircraft, land vehicles, and waterborne vessels must be available to effect desired coordination of them. Similarly, the ability to determine the presence and location of "enemy" aircraft, vehicles and waterborne vessels is equally important.

The dramatic rise in recent years of the price of certain natural resources has increased the need for accurate determination of the position of prospecting and mining vehicles and vessels. Position must be precisely determined because of the high cost of detecting and of mining such natural resources. Often, the vehicle or vessel cannot adequately determine or indicate its exact position.

It is often imprudent, if not impossible, for the prospecting or mining vehicle or vessel to mark its location for later reference. For example, in land prospecting or mining, it may not be prudent to leave location indicators. Further, prospecting often is performed from the air using aircraft and satellites; it is often difficult to coordinate the ground crew with the crew in the air or at a ground station. Land satellites also are subject to geological and physical changes. Deserts, for example, have been found to be abundant sources of certain natural resources such as oil and natural gas. Shifting of desert sand causes geological formations to change rapidly and causes location markers to be buried or moved.

Position in detecting problems in an undersea prospecting and mining environment often are more acute than on land. The ocean floor offers a significant opportunity for the recovery of specific natural resources (for example, oil, natural gas, metals, and rare elements). Locating marking buoys typically are not practical and may provide competitors with valuable information. Buoys usually can only be used in relatively shallow waters to mark an underwater location.

Deeper and deeper waters are being prospected to recover natural resources, such as oil and natural gas. State of the art technology now allows oil and gas wells to be drilled at depths previously impossible to reach. The cost of drilling such wells, however, is substantially greater than wells in shallower water. Further, leases of deep water drilling sites often are very expensive. Consequently, it is essential that the position of prospecting and of drilling sites be accurately determined. A well drilled at the wrong location can result in significant economic loss.

Often, for example, a well drilled 20 to 30 yards from a desired location produces signicantly less oil or gas than over drilled at the poper location; and the errant drill site may lie outside the lease hold. It can be appreciated that a prospecting or drilling vessel 200 kilometers offshore requires extremely precise location determining capability where an accuracy of $+/-10$ meters is required (in this example, the required accuracy would be 1/20,000).

Undersea oil and gas pipelines, communications cables, and electric power transmission systems are becoming more and more common. Often they traverse large expanses of water and are far removed from the nearest coastline. Accurate determination of their position is necessary to build and repair them.

The substantial and ever-growing need for distance and position measuring systems has spawned a variety of systems and methods. Some conventional systems employ optical means to determine the distance or position of the receiving station from a transmitting station(s). Laser beams often are used in such optical systems. The laser beam typically is focused by the transmitting station at the receiving station. The receiving station detects the laser beam and performs the required analysis to determine its precise position. Such an optical system can only be employed over short distances (typically up to 20–25 km). The optical frequencies at which the laser emits light often exhibit significant attenuation and/or distortion over the transmission path due to dust, smog, rain, mist, etc. The laser beam often has to be transmitted at a high power level to traverse the distance being measured. Any object in the path of the beam impairs, and may even prevent, proper operation. In certain situations, the high level of the laser beam particularly near the transmitting station can cause damage to an object in its path. The laser beam cannot curve with the surface of the earth. Often, tall towers are used at the transmitting and receiving stations to allow greater distances to be measured. Nevertheless, there is a maximum distance at which the transmitting stations can be displaced from the receiving station in order for such a system to be employed.

Satellites are employed in other conventional systems. Often, the satellite acts as a transmitting station that is positioned in the sky above the area in which the receiving station is located. The receiving station, typically using a microwave link, beams up data to the satellite and receives data back from the satellite used to determine distance or position. The satellite usually is displaced a substantial distance from the receiving station. As is well known, a satellite in a geostationary orbit (that is displaced from the earth's surface by distance of approximately 22,400 miles) rotates at the same rate as the earth so that it maintains its position constant relative to a given position on the earth's surface. Geostationery satellites are usually used in conventional system because the satellite needs to be located at all times so that distance or location can be determined. Such systems are susceptible to significant inaccuracies due to the very great distance between the satellite and the receiving station. For example, extreme accuracy must be achievable with a satellite in a geostationary orbit since it is displaced from the receiving station by at least about 22,400 miles. Satellite systems also are extremely expensive because the cost of constructing and launching a satellite is very high.

Other conventional systems transmit radio frequency signals (from the very low frequency bands up to the microwave bands) from the transmitting station to the receiving station. Typically, the transmitting station is located at or near the coastline. Various types of modulation techniques are employed. Some systems transmit data from the transmitting station to the receiving station, while others use the signals themselves to derive the desired distance or position information.

Within conventional radio frequency systems is a group that employs the strategy of measuring at the receiving station the difference in phase between the signal received from the transmitting station and a reference signal generated at the receiving station. The phase of the reference signal is or has been calibrated to be the same as the phase of a reference signal at the transmitting station used to generate the signal that is transmitted. Typically, very precise signal sources (such as atomic clocks) are used at the transmitting and at the receiving stations to generate the reference signals. Note that the precise signal source at the transmitting station usually is calibrated with respect to frequency and phase with the precise signal source at the receiving station prior to the system being put into service. Thereafter, over the time frame in which the calibration can be maintained, the reference signal generated by the signal source at the receiving station will have the same phase and frequency as the reference signal generated at the transmitting station.

As is well known, the phase of a signal changes in accordance with the distance of a receiving station from a transmitting station. To illustrate, imagine that a signal having a frequency of 1.8 MegaHertz (MHz) is generated at a transmitting station in accordance with a signal provided by an atomic clock and is transmitted to a receiving station displaced from the transmitting station. Because the signal has a frequency of 1.8 MHz, it must propagate only over a distance of approximately 166 meters in order for it to complete a full cycle.

Such conventional systems employ this fact in determining the position of the receiving station from the transmitting station. It can be appreciated that the phase of the received signal is directly proportional to the distance that the receiving station is displaced from the transmitting station. By generating a signal at the same frequency as the transmitted signal and having the phase equal to the phase of the signal source (atomic clock) at the transmitting station, the receiving station can determine its position by comparing the phase of this signal with the phase of the received signal.

Single signal systems do not provide the distance or position measuring capability that usually is required. Referring again to the example presented above, a signal having a frequency of 1.8 MHz goes through a complete cycle every 166 meters. After the receiving station has been displaced from the transmitting station by more than one complete cycle or wavelength (throughout the specification the term "lane" is used as another name for a complete cycle or wavelength; in the example presented here, a complete cycle, wavelength or lane is 166 meters), the receiving station cannot determine its position relative to the transmitting station unless the number of complete cycles or lanes can be counted or accumulated by the receiving station as it moves away from the transmitting station.

This counting of complete lanes is the approach used in conventional systems that employ a single signal phase measurement approach. The number of complete lanes typically is counted by the receiving station as it moves away from the transmitter station. The number of complete lanes is accumulated and used to provide the distance and/or location data.

The position of the receiving station is lost in such systems when the count of the number of complete lanes becomes inaccurate. This inaccuracy can be caused by several factors. Loss of the transmitting signal for a time period greater than the time required for the receiving station to travel more than a complete lane (in the example, this is 166 meters) results in an improper count of complete lanes. Loss of the transmitting signal can be caused, for example, by malfunctions in the transmitting or the receiving station, by interference or loss of signal due to propagation changes caused by changes in the ionosphere, or by interfering signals emitted by other transmitting stations, shipboard equipment, generating equipment, etc. Typically, the ionosphere exhibits radical changes over the course of a complete day at the frequencies that are employed in such a single signal system. During the daytime, for example, in the very low frequency band (1.5 to 2.0 MHz) only ground wave signals are propagated by the ionosphere and thus are received at the receiving station. (An illustration of this is the fact that only local stations can be received during daylight hours in the AM band in the U.S.) At night, however, the ionosphere becomes electrically charged, which results in reflective propagation. This results in multi-path problems at the receiving station (due to the reception of the reflected signal and the ground wave signal) or in loss of any received signal because the reflected signal hoos over and the ground wave signal does not reach the receiving station.

One typical approach used to provide a full lane count at the receiving station is to have the receiving station return to the transmitting station and then move back to the prospecting or drilling site. The high cost of operating a prospecting ship or drilling rig (often times several hundred thousand dollars a day), however, militates against having the ship or rig return to the transmitting site each time the lane count is lost. Another approach is to have a helicopter fly from the transmitting station to the receiving station to measure the number of complete lanes and to provide this lane count to the receiving station. The helicopter approach, which is the most commonly used one, is also extremely expensive because it requires the helicopter to fly from the transmitting station to the receiving station at least once a day. Note that when the lane count is lost, the ship or rig cannot do any work until the lane count has been acquired. This down time is caused because the exact distance or position of the receiving station cannot be determined when the lane count is lost. Thus, the helicopter must be immediately brought to the transmitting station and flown to the receiving station in order for the receiving station to begin work again. This essentially results in the dedication of a helicopter for the entire time that the ship or rig is in operation.

Related to conventional single frequency systems are systems that utilize a pair of signals transmitted from each transmitting station. The signal pair is used in an attempt to provide the ability to recover the lane count without having to return the receiving station to the transmitting station or to have a helicopter fly from the transmitting station to the receiving station to determine the lane count. Representative systems of this type are shown in the following U.S. Pat. Nos. 3,325,811 to Earp, 3,397,400 to Maass et al, 3,613,095 to Elwood, 3,797,015 to Elwood, 3,816,832 to Elwood, 3,839,719 to Elwood, 3,916,410 to Elwood, and 4,283,726 to Spence et al.

The technical strategy behind the conventional signal pair systems shown in these patents is that the pair of signals can be used to generate two measurement lanes: a fine lane and a coarse lane as they are typically called. As stated above, the term "lane" is synonymous with complete cycle or wavelength and means the distance at which a signal of a given frequency must propagate in order to go through a complete cycle. As is well known, the higher the frequency of a signal, the shorter its wavelength; the shorter the wavelength, the shorter the distance required for the signal to go through a complete cycle. Thus, for example, a signal having a frequency of 1.8 MHz goes through a complete cycle in 166 meters (which means the lane it defines is 166 meters long; in this example, this is the fine lane). In comparision, a signal having a frequency of 500 Hz goes through a complete cycle in approximately 600 kilometers (which means the lane it defines is 600 kilometers long; in this example, this is the coarse lane).

In these conventional two signal systems, the two signals are precisely displaced in frequency with respect to each other. Typically, the signal displacement is in the range of 500 Hz to 2 KHz. The close frequency spacing is due part to frequency spectrum restrictions imposed by licensing authorities in the countries where such systems are used. As is well known, the increased use of the frequency spectrum has resulted in severe crowding and deteriorated technical performance caused by such crowding. Licensing authorities usually will not allow a pair of signals to be displaced from each other by more than approximately 2 KHz.

In these two signal systems, the typical frequency displacement or difference between the pair of signals is from 0.5 to 4 KHz. For purposes of illustration, assume that the carrier frequency for each of these two signals is approximately 1.8 MHz and that they are displaced from each other by 1 KHz. One of the pair of signals is used to provide the fine lane measurement (which for a 1.8 MHz signal, as stated above, defines a fine lane which is 166 meters in length). The fine lane measurement is produced by comparing at the receiving station the received signal with a reference signal generated at the receiving station which has the same frequency (for example, 1.8 MHz), and a phase which is the same as the phase of the reference signal used to generate the transmitted signal at the transmitting station. The comparison of the phase of the received signal with the phase of the reference signal allows the position of the receiving station within a fine lane (which is 166 meters long) to be determined.

In such two signal systems, the total number or count of fine lanes is attempted to be determined at the receiving station by mixing the two received signals to produce a delta or difference frequency signal. The difference frequency signal has a frequency equal to the frequency displacement between the two received signals, and has the same phase that a signal having a frequency equal to the difference frequency would have if such a very low frequency signal was transmitted by the transmitting station and had propagated to the receiving station.

In the example, the two signals are displaced from each other by 500 Hz. The distance requirement for such a very low frequency 500 Hz signal to go through a complete cycle is 600 km. Instead, suppose such a 500 Hz signal could actually be transmitted by the transmitting station and received by the receiving station. The same coarse lane capability could be obtained. Practically, however, such a 500 Hz signal cannot be transmitted and received because it would require enormous antennas and transmitting and receiving equipment having very large sized tuned circuits. Further, it would require antennas and equipment entirely separate from that used to transmit and receive the 1.8 MHz signal that provides the fine lane.

The two signal system produces at the receiving station a low frequency difference signal having a very precise phase relationship to the transmitted signal, which difference signal can be used in an attempt to determine the count of fine lanes by which the receiving station is displaced from the transmitting station.

In such conventional systems, the phase of the difference frequency signal is compared with the phase of a reference signal generated at the receiving station having the same frequency as the difference signal, but whose phase is equal to the phase of the transmitting station reference signal that generates the pair of signals that are transmitted. The difference between the phase of the receiving station reference signal and the difference frequency signal provides an indication of the position in the coarse lane of the receiving station with respect to the transmitting station. In the example where the difference frequency signal has a frequency of 500 KHz, the receiving station can be removed from the transmitting station a distance up to 600 km before the difference frequency signal has gone through a complete cycle or lane. In this way, conventional systems attempted to determine the exact position of the receiver by first using the coarse lane measurement provided by the difference frequency signal to determine the count of the fine lanes that the receiving station was displaced from the transmitting station, and then zeroing in on the actual position within the fine lane by using the fine lane measurement.

In theory, such conventional systems appeared to be capable of providing total real time distance and position measuring capabilities. However, in practice, for the reasons discussed below, such real time distance and position measuring capabilities have not been obtained and such two signal systems have not achieved the commercial success that it was thought they would obtain.

The fine lane measurement in conventional two signal systems has a repeatable accuracy satisfactory to achieve a measurement of +/−10% of the fine lane length. The course lane measurement in conventional two signal systems also has a repeatable accuracy satisfactory to achieve a measurement of +/−10%, of the length of the coarse lane. The problem with such repeatable accuracy with respect to the coarse lane is that +/−10% of a course lane that has a 300 kilometer length is +/−30 km. Obviously, it is impossible with such an accuracy in the coarse lane to determine the fine lane count since each fine lane is only 166 meters in length. In other words, the coarse measurement capability in conventional systems is insufficient to determine the number of fine lanes that the receiving station is removed from the transmitting station.

Messrs. Spence and Martin in U.S. Pat. No. 4,283,726 addressed the course lane measurement problem from the perspective of the transmitting station and the transmitted pair of signals. Phase jitter and other phase error problems associated with conventional two signal systems employing single sideband and suppressed carrier generation techniques were substantially eliminated by the transmission of two continuous wave carrier signals displaced from each other by a preselected difference frequency amount. Spence and Martin found that the use of the pair of unmodulated carrier signals substantially improved the phase integrity of the transmitted signals as compared to the modulation techniques employed in prior systems. These improvements significantly reduced the phase inaccuracy caused by the transmitting side of the two signal distance and position measuring systems and methods.

However, despite the fact that the transmitted signals had been significantly improved with respect to phase integrity in the Spence et al. system, such a system still could not produce the desired accuracy on a repeatable basis with respect to the coarse lane measurement. Further, the accuracy of the fine lane measurement was not high enough in certain applications. For example, certain oil and gas leases require the location of the bore hole to be within one or two meters of a particular point.

The inventor has discovered that conventional receivers utilized in such conventional two signal systems contribute significantly to the inaccuracy associated with the coarse lane measurements and with the fine lane measurement. He has found that the propagation of the transmitted signals to the receiving station has also been found to introduce additional phase errors. He has found that conventional receivers introduce phase error during the processing of the received pair of signals.

Turning first to the phase errors produced by the propagation of the transmitted signal to the receiving station, there often are signals in addition to the ground wave signal which are received at the receiving station. The additional signals are due to the reflection of the transmitted signal from the ionosphere or from other paths. This creates what is called a multi-path signal situation, where the receiving station receives in very close succession more than one version of the transmitted signal. Because these signals travel paths of different lengths in their propagation from the transmitting to the receiving station, there is a phase difference between these various signals when they are received at the receiving station. This multi-path problem causes a measurement error to be produced both in the coarse lane and in the fine lane because the receiver is utilizing more than one version of the received signal(s) to produce the signals that are phase compared with the corresponding reference signals generated at the receiving station.

The multi-path problem typically has both a short term and a long term life span. With the respect to short term, it is often observed that the multi-path problem can be created for a very short amount of time (from several seconds to several minutes) and then go away. This is caused by such things as the position of the receiving station relative to the transmitting station, as well as the movement of other objects between the receiving station and the transmitting station. The multi-path problem can thus cause a distortion on a somewhat transient basis with respect to the fine measurement and the course measurement.

On the long term basis, the multi-path problem can occur during certain periods of the measurement day. As is well known, the characteristics of the ionosphere change, often dramatically, during a 24 hour period. Such change often is due largely to the fact that the ionosphere during sunlight does not reflect a transmitted signal (and thus the ground wave signal predominates), but after sundown reflects the transmitted signal and thus the multi-path problem. (This can be experienced by listening to the AM radio band in the United States at night when stations from great distances can be received that normally cannot be received during daylight.) In conventional systems, distance and position measurements cannot be obtained after sundown because of the severity of the multipath problem.

As stated above, the inventor has also found that conventional receivers contribute significantly to the unacceptable error exhibited by conventional systems. Phase distortion of the received pair of signals has been found to be caused by the signal processing performed by the receiver. Such phase distortion has not been addressed in conventional receivers because receivers typically are not utilized to produce a signal output having a precise phase relationship. Instead, conventional receivers typically have been directed to providing the ability to detect low level signals in a crowded frequency band so that the intelligence that they carry can be derived. Phase distortion typically is not a consideration in such receivers because the phase does not carry any intelligence that is needed.

One and two signal systems have highlighted the phase distortion problems associated with conventional receiver technology. Until these systems, there really was no need and also no ability to measure the phase distortion or error produced by conventional receivers. As stated above, there was no need in conventional receivers for such precise phase integrity because the phase did not carry any intelligence. Further, the measurement of the phase distortion was impossible to achieve in conventional receivers because there were no methods or equipment to measure it with a sufficient degree of accuracy.

One and two signal systems, however, have brought into focus the phase distortion deficiencies in conventional receivers.

In analyzing the phase distortions produced by conventional receivers used in two frequency signal systems, the inventor of the present invention has isolated several causes for these phase distortions caused by the receiver itself. Specifically, in addition to the multi-path signal propagation problem discussed above, the change in the received signal level (RSL) of each of the signals at the receiving station causes the receiver to introduce phase error or distortion to the received signals as they are processed by the receiver.

The inventor has also determined that phase distortions are caused by the variation in the temperature at which the receiver is operated. Phase errors are also caused by variations in the voltage level of the electrical sources which provide power to the receiver. All of these factors contribute to the generation of the phase distortions as the received signals are processed by the receiver.

The inventor has also determined that phase errors are caused by the bandpass filters utilized in conventional receivers. For example, the inventor has discovered that the bandpass filters, which are required to separate the received signals from each other and from adjacent signals in the frequency spectrum, produce phase errors because they do not exhibit a flat amplitude response over the pass band of the filter. Furthermore, conventional bandpass filters introduce a different phase distortion on the signals that are being filter depending on the level of the signal provided to the input of the filter. Reproducibility of a desired flat bandpass response is also unobtainable in conventional bandpass filters because of the variation in the phase change with respect to signal amplitude value exhibited by the crystal elements that are the integral components in such conventional bandpass filters.

Additional phase errors have been found by the inventor to be caused by variations in the required signal level (RSL) of the received signals. Conventional receivers are not designed to operate over the large dynamic RSL range that are experienced in such conventional two-signal systems. Specifically, as the receiving station gets further and further away from the transmitting station, the RSL of the received signal gradually decreases, so that at a certain distance, the signal is at a very low RSL level. Thus, the receiver at the receiving station must be able to provide appropriate signal processing of the received signals from a very high RSL (which is present when the receiving station is very near the transmitting station) to a very low RSL (when the receiving station is almost the maximum distance that it can be from the transmitting station) in order for the desired distance or coarse lane and fine lane measurement capability to be provided. Conventional receivers are not designed to operate over such a dynamic RSL range.

The inventor has also found that conventional receivers only generate one single difference frequency signal from the pair of signals that are received. Thus, conventional receivers only utilize a single coarse lane in performing the measurement needed to determine the fine lane count. Systems that produce more than a one difference signal employ a concomitant increase in the number of transmitted signals that are received. For example, two or three difference frequency signals could be produced in a system employing three transmitted signals, but conventional systems could not produce more than a one difference frequency signal if only two signals are being transmitted by the transmitting station.

SUMMARY OF THE INVENTION

A distance measuring receiver system and method for determining the distance from a receiving station from a transmitting station, which provides the distance information by the reception and processing of a pair of signals (preferably continuous wave carriers) transmitted by the transmitting station. The receiver receives the pair of signals (upper signal F1 and lower signal F2) using a conventional antenna, which is connected to a front end subsystem having a preselector stage cascaded with a radio frequency amplifier stage of a front end sub-system for amplifying the signal pair at R.F. A mixer in the front end subsystem frequency translates the amplified signal pair and other signals within the passband of the front end to a preselected baseband frequency. All of the signals at baseband are supplied to the upper channel and to the lower channel of a filter subsystem.

A local oscillator subsystem supplies a local oscillator signal to the mixer for tuning the receiver. In a preferred embodiment, the oscillator subsystem comprises a phase lock loop driven by a clock signal from the oscillator subsystem discussed below. The output of the phase lock loop, which constitutes the local oscillator (L.O.) used by the mixer of the front end to heterodyne the received signal pair down to baseband, is supplied to a frequency divider chain. The frequency divider chain divides the output of the phase lock loop by divisions selected by the user via thumbwheel switches. One of the signals from the frequency divider chain is fed back as the other input of the phase lock loop. The user tunes the receiver by changing the divisors using the thumbwheel switches. Very accurate and precise tuning is obtained. A lock detect circuit connected to the phase lock loop indicates when the loop is in the lock state.

The upper channel extracts the upper signal from the baseband signals. The lower channel extracts the lower signal from the baseband signals. Both the upper channel and the lower channel of the filter comprise gain blocks cascaded with crystal filter elements and varactor diodes which produce a flat bandpass response with high skirts. The filtered output of the upper channel is provided to an isolation amplitude stabilizing amplifier, which amplifies the filtered signal by a preselected amount. Similarly, the filter output of the lower channel is provided to an isolation amplitude stabilizing amplifier, which amplifies the filtered signal by a preselected amount.

The present invention employs several approaches for substantially eliminating the introduction of phase distortion or error caused by signal processing in the receiver. Specifically, an upper channel automatic gain control (AGC) stage in accordance with the received signal level (RSL) of the signal pair at R.F. controls the $V_{cc}$ voltage provided to the preselector R.F. amplifier stages of the front end subsystem, and the gain blocks and the isolation amplifier of the upper channel so that the power output of each amplifying stage and active device is maintained at a preselected value irrespective of the signal pair RSL level. Similarly, the lower channel automatic gain control (AGC) stage in accordance with the received signal level (RSL) of the signal pair at R.F. controls the $V_{cc}$ voltage provided to the gain blocks and the isolation amplifier of the lower channel so that the power output of each amplifying stage and active device is maintained at a preselected value irrespective of the signal pair RSL level. In addition, the varactor diodes cancel out the minute capacitance changes exhibited by the crystal tuned circuits in the upper and lower filter channels due to the change in $V_{cc}$, the input signal power level and the movement of the operating point of the active devices.

The output of the upper channel of the filter subsystem is supplied to the first channel of a lane expansion subsystem. The output of the lower channel of the filter subsystem is supplied to the second channel of the lane expansion subsystem. The lane expansion subsystem produces a plurality of difference frequency signals having frequencies which are integer multiples of the frequency separation between, or difference frequency of, the signal pairs, and having phases of a signal of those frequencies which had propagated from the transmitting station to the receiving station. Specifically, a first difference signal is generated by dividing by two the signal on the first channel and dividing by two the signal on the second channel, and then mixing each of the divided signals together to produce a difference frequency signal having a frequency value equal to one-half of the frequency separation between the upper signal F1 and the lower signal F2 at R.F. A second difference frequency signal is produced by frequency doubling the signal on the first channel and frequency doubling the signal on the second channel, and then mixing these two signals together to produce a difference frequency signal having a frequency value equal to twice the frequency separation between the upper signal F1 and the lower signal F2 at R.F. A third difference signal is produced by frequency doubling three times the signal on the first channel used to produce the second difference signal and frequency doubling three times the signal on the second channel used to produce the second difference signal, and then mixing these two signals together to produce a difference frequency signal having a value that is 16 times the frequency separation between the upper signal F1 and the lower signal F2 at R.F. Finally, a fourth difference frequency signal is provided by frequency doubling three times the signal on the first channel used to produce the third difference frequency signal and by frequency doubling three times the signal on the second channel used to produce the third difference frequency signal, and then mixing these two signals together to produce a difference frequency signal having a frequency value that is 128 times the separation between the upper signal F1 and the lower signal F2 at R.F.

The lane expansion subsystem employs linear expansion amplifiers of the type shown in U.S. Pat. No. 3,681,075 to Spence. Such linear expansion amplifiers double the frequency and the phase of the input signal without introducing any appreciable distortion in the phase of the frequency doubled signal. The signal that is produced by the mixing of these frequency doubled signals has a frequency equal to the frequency separation between the frequency doubled signals and a phase of a signal having a frequency equal to frequency separation which has propagated from the transmitting station to the receiving station. Thus, each of the four difference frequency signals contains phase information equal to the phase information of a signal having the frequency of the frequency separation which has propagated from the transmitting station to the receiving station. This allows the present invention to produce additional measurement lanes having lengths which are between the length of the coarse lane and the fine lane. These additional measurement lanes are used by the present invention to zero in on the actual position of the receiving station in real time with a very high degree of accuracy.

An oscillator subsystem generates an oscillator signal of a preselected frequency and having a phase equal to the phase of the oscillator signal generated at the transmitting station used to synthesize the transmitted signal pair. The oscillator signal is generated as a function of a clock signal generated by a precise source (such as an atomic clock).

The oscillator signal is supplied to a reference subsystem. The reference subsystem generates a plurality of reference signals having frequencies equal to corresponding difference frequency signals and having phases equal to the phase of the oscillator signal from the oscillator subsystem. In a preferred embodiment, the reference subsystem comprises a phase lock loop which generates a fundamental signal at the output of a mixer of the phase lock loop. The phase lock loop is driven by a signal which is a function of the oscillator signal from the oscillator subsystem. The fundamental signal is frequency divided by a plurality of frequency dividers to produce the plurality of reference signals having frequencies equal to the frequencies of the corresponding difference frequency signals with which they are compared in the phase comparator subsystem discussed below. One of the frequency divided signals is fed back to control the operation of a frequency divider in the phase lock loop. This feedback allows the phase lock loop to move up and down the digital frequency train that is being locked on a cycle-by-cycle basis, thereby allowing a very selective and precise variation in frequency generation to be achieved. One of the other frequency divided signals is fed back to a comparator, which compares it to a signal having the same frequency supplied by the phase lock loop. The comparitor produces a control signal whose value is proportional to the comparison. This control signal is used to control the operation of an oscillator which generates one of the two input signals supplied to the mixer.

The plurality of reference signals is compared with the corresponding difference frequency signals in a phase comparison subsystem. Each phase comparison produces information indicating the location of the receiving station in a lane whose length is determined by the frequency of the signals whose phase is being compared. The result of the phase comparison produces distance and prosition information indicative of the distance and position of the receiving station from the transmitting station. Because of the different length of each of the measurement lanes being produced by the plurality of difference frequency signals, a plurality of values of the position of the receiving station within the lanes allows the receiving system to zero in on the exact position of the receiving station. Errors associated with each measurement lane are eliminated because the next shorter lane precisely locates the position of the receiving station within the next longer lane. By employing a plurality of lanes of different lengths, the receiving system of the present invention can produce an accurate measurement of the position and distance of the receiving station relative to the transmitting station irrespective of phase and signal propagation problems.

BRIEF DESCRIPTION OF THE DRAWINGS

The objects, advantages and novel features of the present invention will become apparent from the following detailed description of the invention when considered in conjunction with the accompanying drawings.

FIG. 3 comprises FIGS. 3A, 3B, and 3C;

FIG. 4 comprises FIGS. 4A, 4B, and 4C;

FIG. 4D is a schematic of a preferred embodiment of the isolation amplifier;

FIG. 6 is a schematic of a preferred embodiment of the reference subsystem used to generate the plurality of reference signals in accordance with the oscillator signal supplied by the oscillator subsystem.

DETAILED DESCRIPTION OF THE PREFERRED EMBODIMENT

Table of Contents

I Receiver System Method Overview
II Detailed Description of Subsystems and Methods
  A. Front End Subsystem
  B. Oscillator Subsystem
  C. Filter Subsystem
  D. Lane Expansion Subsystem
  E. Reference Subsystems
  F. Phase Comparator Subsystem

I. Receiver System and Method Overview

Figure 1:
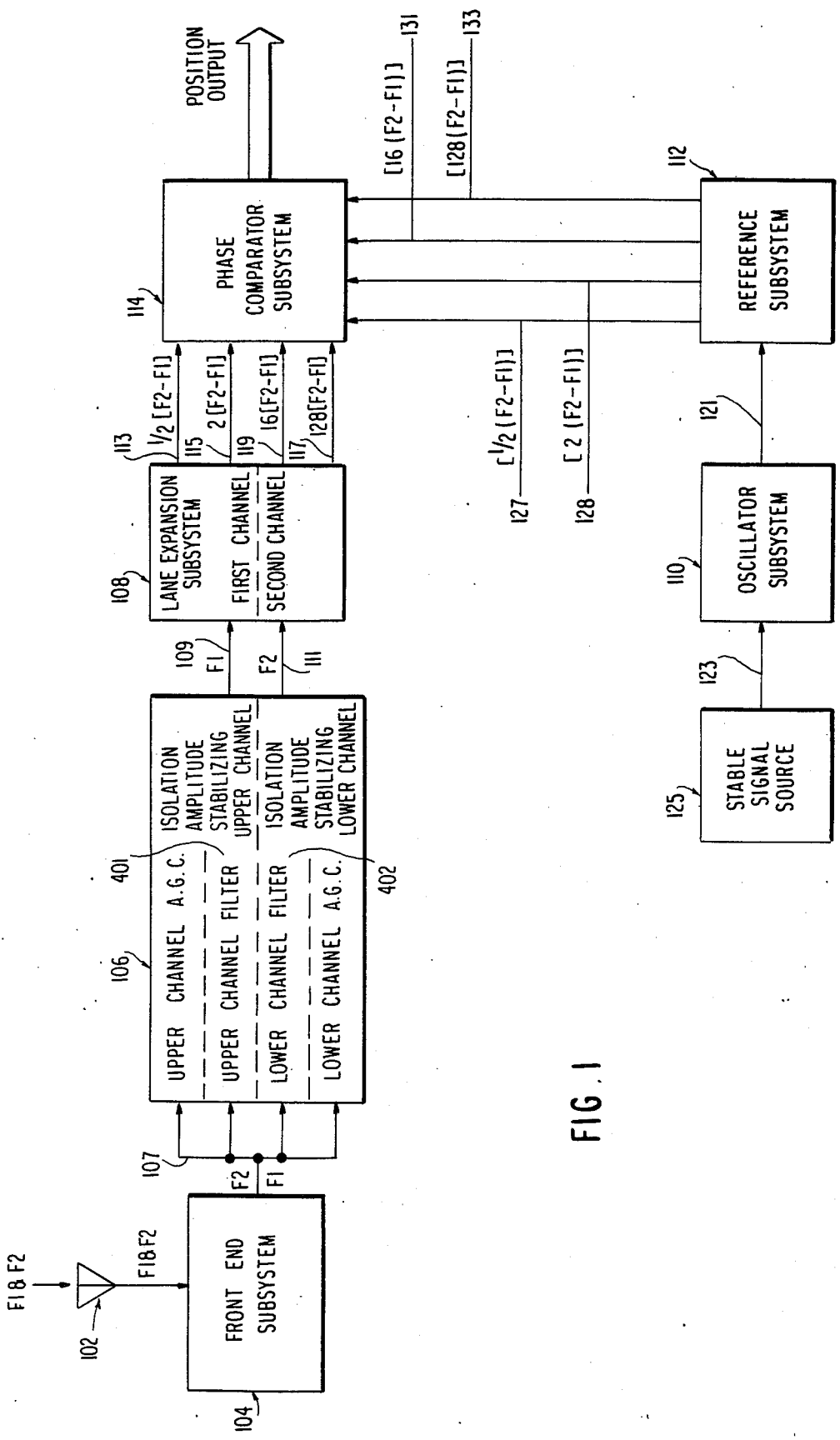
FIG. 1 is an overall block diagram of the receiving system and method of the present invention.

The distance and position measuring receiver system and method of the present invention is shown in general block diagram form in FIG. 1. The present invention provides the distance and position of the receiving station relative to the transmitting station by the reception and processing at the receiving station of a pair of signals F1, F2 (preferably continuous wave carrier signals but the present invention can accomodate signals generated using modulation techniques such as single sideband, suppressed carrier, double sideband, etc.) transmitted by the transmitting station (not shown). The signals, denominated F1 and F2, where the first/or upper signal F1 is greater in frequency than the second/or lower signal F2, are displaced precisely in frequency from each other by an amount equal to delta F ( F). The importance of delta F is explained in detail below. It should be understood that representative values of the length of the coarse, intermediate and fine lanes and the frequency separation (difference frequency F) of the pair of signals F1, F2 are provided only as an aid in understanding the structure and operation of the present invention, and they should not be construed as limiting factors. Any frequency separation (delta frequency) may be employed in accordance with the present invention, and lanes of other length than those shown in the examples may be employed.

Specific reference is made to the following United States patents, whose contents are expressly incorporated by reference into this document U.S. Pat. Nos.: 3,613,096 to Elwood; 3,681,705 to Spence; 3,797,015 to Elwood; 3,816,832 to Elwood; 3,839,719 to Elwood; 3,916,410 to Elwood; 4.268,807 to Spence; and, 4,283,726 to Spence and Martin.

A single radio frequency antenna 102 of conventional design receives the pair of signals F1, F2. Note that as an alternative approach more than one antenna can be employed. Alternatively, a separate antenna for receiving the upper signal F1 and a separate antenna for receiving the lower signal F2 can be employed. All that is required here is that a suitable antenna(s) be employed for providing to a front end subsystem 104 a signal or signals containing the signals F1, F2.

The output of antenna 102 is provided to the input of the front end stage 104. Front end subsystem 104 includes a preselector stage 320 cascaded with a radio frequency (R.F.) amplifier stage 350. Preselector stage 320 amplifies the portion of the R.F. spectrum containing the pair of signals F1 and F2, which portion is provided by antenna 102. Preselector stage 320 (in conjunction with a upper channel automatic gain control (AGC) stage 450 discussed below) amplifies the portion of the R.F. spectrum so that the power output is at a preselected level irrespective of the received signal level (RSL) of the pair of signals F1, F2.

The output of preselector stage 320, which includes amplified versions of the pair of signals F1, F2, is provided to the input of the R.F. amplifier stage 350. R.F. amplifier stage 350 (in conjunction with the upper channel AGC stage 450) amplifies the output of preselected stage 320 so that the power output is at a preselected level irrespective of the RSL of the pair of signals F1, F2. Both the preselector stage 320 and the R.F. amplifier stage 350 perform the desired amplification without introducing any appreciable phase distortion to the upper signal F1 or to the lower signal F2.

The output of R.F. amplifier 350 is provided to a first input 392 of a mixer stage 396. A second input 394 of mixer stage 396 is provided with a local oscillator (L.O.) signal from a local oscillator subsystem 802. The local oscillator signal has a frequency which is selected the user so that mixer stage 396, when it mixes the local oscillator signal with the portion of the R.F. spectrum containing the pair of signals F1, F2, frequency translates signals F1, F2 down to a preselected baseband frequency range (referred to herein as baseband). It can be appreciated that the tuning frequency of the receiving station is set by the frequency value of the local oscillator signal. This allows the user to control this tuning frequency by adjusting the value of the local oscillator signal. The phase of the local oscillator signal is precisely controlled since it is generated in accordance with a clock signal provided by an oscillator subsystem 110.

In a preferred embodiment, the local oscillator subsystem 802 comprises a phase lock loop driven by the clock signal from oscillator subsystem 110. The output of the phase lock loop, which constitutes the local oscillator (L.O.) used by mixer 350 to heterodyne the received signal pair F1, F2 down to baseband, is supplied to a frequency divider chain. The frequency divider chain divides the output of the phase lock loop by divisors selected by the user via thumb wheelswitches. One of the signals from the frequency divider chain is fed back as the other input of the phase lock loop. The user tunes the tuning frequency of the receiving station by changing the divisions using the thumbwheel switches. Very accurate and precise tuning is obtained. A lock detect circuit connected to the phase lock loop indicates when the loop is in the lock state.

There are two outputs of mixer 350 of front end subsystem 104. A first output 393 provides both the upper signal F1 and the lower signal F2 to an upper channel 401 of a filter subsystem 102. A second output 395 provides both the upper signal F1 and the lower signal F2 to the lower channel 402 of filter subsystem 106. Only upper channel 401 is described here since its structure and operation is identical to that of the operation of lower channel 402; any significant differences between their structure and operation is noted.

Upper channel 401 receives at baseband on a portion of the spectrum containing both upper signal F1 and lower signal F2. A typical value upper signal F1 at baseband is 600.5 KHz. Upper channel 401 includes plurality gain blocks, each of which (in conjunction with the upper channel AGC stage 450) amplifies the baseband signal so that the power output of the block is a preselected value irrespective of the level of the input signal to the block. Interposed between certain pairs of the gain blocks are tuned circuits including piezoelectric quartz crystals and capacitors along with associated varactor diodes. The tuned circuits provide the desired passband response exhibiting high skirts that is required to separate upper signal F1 from lower signal F2 and other signals present in the passband.

Upper channel AGC stage 450 present in the upper channel 401 is responsive to the received signal level (RSL) of the signal pair F1, F2 R.F. AGC stage 450 produces an AGC signal having a value proportional to the RSL level. As noted the AGC signal is provided to the gain stages of upper channel 401 and also to preselector stage 320 and R.F. amplifier stage 350 of the front end subsystem 104. The AGC signal controls the level of the power supply voltage applied to each of these stages. This voltage level control allows the AGC signal to assure that the active devices of each of the stages controlled by the AGC produces a preselected power output, irrespective of the RSL level of the signal pair F1, F2, the voltage supply level, changes in amplification due to temperature, the input signal level, etc. In this way, AGC stage 450 precisely controls the amplification of the signals being processed at each stage so that the receiver is operating at precisely the same point in the operating curve of each active device, irrespective of these variables. This mode of operation results in a substantial reduction in the phase error or distation that normally would be produced signal processing by the receiver. Conventional receivers did not employ such a precise AGC control of the AGC and do not use multiple stages of amplification, thereby intoroduces considerable phase error when the input signal or other peramaters are varied. (The only difference in the lower channel 402 is that the lower channel AGC stage only controls the amplifying stages and active devices in lower channel 402 and does not control the preselector or the R.F. amplifier stage 350 of the front end subsystem 104.)

The varactor diode associated with each tuned circuit in upper channel 401 also eliminates phase error or distortion of the upper signal F1 during signal processing. Specifically, the varactor diode cancels out minute compacitance changes exhibited by the piszoelectric quartz crystal tuned circuits due to the change in the $V_{cc}$, the input signal power and the movement operating point of the active device. The compacitance characteristic of the varactor diode is chosen so as to counteract exactly the capacitance characteristic of the crystal employed in the tuned circuit. In this way, minute capacitance changes exhibited by the crystal when the voltage applied across it changes is removed by the operation of the varactor diode which cancels out such capacitance changes. In this way, phase distortion or error that would be introduced to the signal being filtered by the crystal element due to the capacitance change is eliminated by the use of the varactor diode in the present invention.

The use of cascaded gain stages and the AGC control in the upper channel allows a the power level at the output of each gain stage to maintained at a precise, constant value. This allows the present invention to operate over a very large dynamic RSL range because signals of very high RSL and very low RSL can be accommodated equally as well. For example, the present invention has a dynamic range of 120 decibels (1 million times 1 million amplification) without introducing any appreciable phase error or distortion to the signals F1, F2 being processed. In contrast, conventional receivers cannot operate effectively over anywhere near this dynamic range without introducing appreciable phase errors distortions to the signals being processed.

The output of the last gain stage of upper channel 401 is provided to the input of an isolation amplitude stabilizing amplifier 902 of filter subsystem 106. The isolation amplifier 902 acts to amplify the signal from the last gain stage of upper channel 902 so that the power output of isolation amplifier 902 is constant. Again, the automatic gain control signal is provided to isolation amplifier so that the power level of the output signal of the isolation amplifier is maintained constant irrespective of the input signal level. Typically, an amplification of between 6 and 10 DB is produced. Isolation amplifier 902 also acts to isolate upper channel 401 from a lane expansion subsystem 108 to which its output is connected.

The output of isolation amplifier 902 of upper channel 401 is provided to a first input 202 of the first channel 290 of the lane expansion subsystem 108. Similarly, lower signal F2 at the output of the isolation amplifier of lower channel 402 of filter subsystem 106 is provided to a second input 204 of second channel 292 of the lane expansion subsystem 108.

Lane expansion subsystem 108 produces a plurality of difference frequency signals having frequencies which are integer multiples of the frequency separation of the signal pair F1, F2 at R.F. The phase of the difference frequency signals is equal to the phase of a signal of the difference frequency if such difference frequency signal had been transmitted by the transmitting station and propragated to the receiving station 101. Note that these plurality of difference frequency signals are produced in the lane expansion subsystem 108 of the present invention despite the fact that only a pair of signals F1, F2 are transmitted by the transmitting station to the receiving station 101.

The plurality of difference frequency signals allows the present invention to zero in on the exact position of the receiving station 101 with respect to the transmitting station. For purposes of illustration, assume that the frequency separation of the signal pair F1, F2 is 1 KHz. As discussed below, each of these signals is divided by a factor of 2 prior to their being mixed them to produce the first frequency difference signal. For example, the frequency of the upper signal F1 at baseband is 600.5 KHz and the frequency of the lower signal F2 at baseband is 599.5 KHz. Because of the division by 2, the frequency of the first difference frequency signal is 500 Hz. As is well known, a 500 Hz signal requires approximately 300 kilometers to go through a complete half wave. Thus, the coarse lane defined by the first difference frequency signal is approximately 300 kilometers. The accuracy that can be achieved with the present invention using only the first difference frequency signal is approximately 2% of the length of the coarse lane. The accuracy that therefore can be obtained using only the first difference frequency signal is approximately +/−6.0 kilometers.

Unlike the conventional systems which employ only a coarse lane provided by the first difference frequency signal and a fine lane provided by either signal F1 or F2, the present invention produces a plurality of difference frequency signals (for example, a second difference frequency signal, a third difference frequency signal, and a fourth difference frequency signal), which allow the present invention to zero in on the position of the receiving station relative to the transmitting station. The generation and use of the plurality of difference frequency signals, which define a plurality of intermediate (ones) is as follows.

Figure 2:
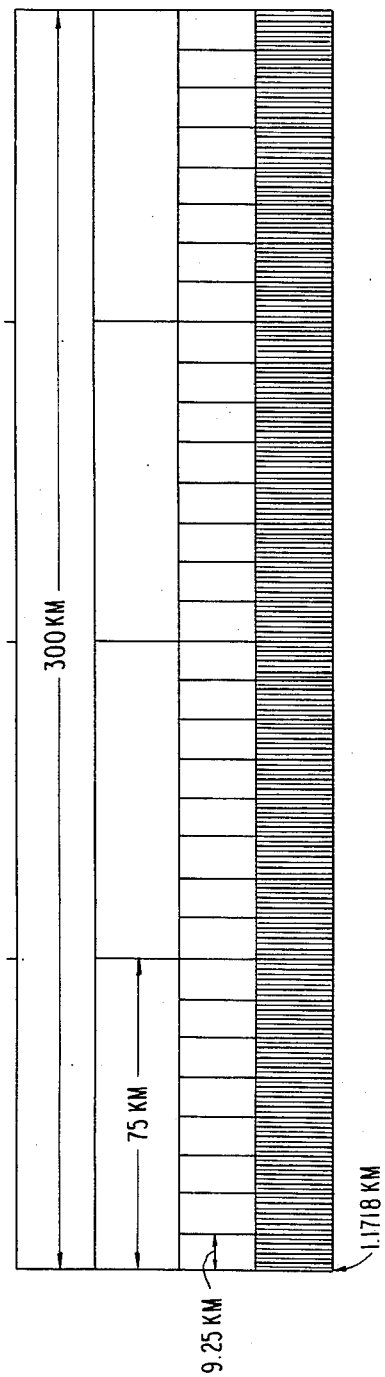
FIG. 2 is a chart diagraming intermediate lanes generated by the present invention having length between the coarse lane and the fine lane, which intermediate lanes allow the present invention to zero in on the actual position of the receiver station with respect to the transmitting station.

The second difference frequency signal is produced by frequency doubling the baseband version of the upper signal F1 and frequency doubling the baseband version of the lower signal F2, and then mixing these two signals together to produce the second difference freqency signal. Because the upper signal F1 and the lower signal F2 are frequency displaced from each other by 1 KHz at baseband, the frequency of the second difference frequency signal in the illustrative example is 2 KHz. Referring now to FIG. 2, (which diagrams the relationship and lengths of the various lanes defined by the plurality of difference frequency signals produced by lane expansion subsystem 108) it is seen that the second difference frequency signal defines a lane of 90 kilometers, where 90 kilometers equals ½ of a complete wavelength of a signal at 2 KHz. The accuracy that can be typically achieved by the present invention using only the second difference frequency signal is +/−2% of the intermediate lane defined by the second difference frequency signal. Thus, the accuracy that can be achieved within the 90 kilometer lane using only the second difference frequency signal is +/−1.8 kilometers.

As is shown in FIG. 2, 4 of the intermediate lanes defined by the second difference frequency signal equals the coarse lane defined by the first difference frequency signal. Because of the +/−2% accuracy within the coarse lane, the present invention is capable of determining which one of the 4 intermediate lanes defined by the second difference frequency signal in which the receiving station is positioned. This shows how the coarse lane allows the present invention to zero in on which of the intermediate lanes defined by the second difference frequency signal in which the receiv station is located.

The third difference frequency signal is produced as follows. The version of the upper signal F1 used to generate the second difference frequency signal is frequency doubled 3 times to produce a signal that has a frequency is 8 times greater than the frequency of the signal used to produce it (and thus 16 times greater than the frequency of the upper signal F1 at baseband). The lower signal F2 used to generate the second difference frequency signal is frequency doubled 3 times to produce a signal that has a frequency which is 8 times greater than the frequency of the signal used to produce it, (and thus 16 times greater than the frequency of the lower signal F2 at baseband). These two signals are mixed together to produce the third difference frequency signal. The third difference frequency signal in the illustrative example thus has a frequency of 16 KHz. As shown in FIG. 2, the intermediate lane defined by the third difference frequency signal is 9.37 kilometers where 9.37 kilometers in length equals one half of the wavelength of a signal at 16 KHz. The accuracy that can be achieved by the present invention within the intermediate lane defined by the third difference frequency signal is +/−2%. Thus, the accuracy that can be achieved within the 9.37 kilometer lane using only the third difference frequency signal is +/−187.4 meters.

The second frequency difference signal allows a measurement accuracy of +/−1.5 kilometer within the 75 kilometer lane defined by it. This accuracy allows the intermediate lane defined by the second difference frequency signal to indicate which one of the 8 intermediate lanes defined by the third difference frequency signal in which the receiving station is located. Thus, the intermediate lane defined by the second difference frequency signal allows the present invention to zero in on which one of intermediate lanes defined by the third difference frequency signal in which the receiving station is located.

The fourth difference frequency signal is produced by frequency doubling 3 times the version of the upper signal F1 used to generate the third difference frequency signal and by frequency doubling 3 times the version of the lower signal F2 used to generate the third difference frequency signal, and then by mixing these two signals together to produce the fourth difference frequency signal. As shown in FIG. 2, the intermediate lane defined by the fourth difference frequency signal is 1,171.8 meters in length, where 1,171.8 meters equals one half of a complete wavelength of a signal having a frequency of 128 KHz. The accuracy that can be achieved within the intermediate lane defined by the fourth difference frequency signal is +/−2%. The accuracy that can be achieved by the present invention within the intermediate lane defined by the fourth difference frequency signal is +/−11 meters.

The third difference frequency signal allows a measurement accuracy of +/−187.4 meters within the 9.37 kilometer lane defined by it. This accuracy allows the intermediate lane defined by the third difference frequency signal to indicate which one of the intermediate lanes defined by the fourth difference frequency signal in which the receiving station is located. Thus, the intermediate lane defined by the third difference frequency signal allows the present invention to zero in on which one of the intermediate lanes defined by the fourth difference frequency signal in which the receiving station is located.

Finally, the fine lane measurement provided by comparing the phase of either the upper signal F1 or the lower signal F2 with a reference signal in the illustrative example defines a lane 166 meters in length, where 166 meters equals a full wavelength of a 1.8 MHz signal. A +/−1 nanosecond accuracy is achievable with the fine lane. Thus, the accuracy that can be achieved within the 166 meter lane using only the upper signal F1 or the lower signal F2 is +/−1 nsec. As used in the present system, this translates into a displacement allowance of +/−1 meter.

The fourth difference frequency signal allows a measurement accuracy of +/−11 meters within the 1,171.8 meter lane defined by it. This accuracy allows the intermediate lane defined by the fourth difference frequency signal to indicate which one of the fine lanes defined by the upper signal F1 or the lower signal F2 in which the receiving station is located. Thus, the intermediate lane defined by the fourth difference frequency signal allows the present invention to zero in on which one of fine lanes defined by the upper signal F1 and the lower signal F2 in which the receiving station is located.

It should be understood that the frequency relationship between the difference frequency signals can be selected in accordace with the desired zeroing in function that is desired. Also, the frequency displacement between the signals F1 and F2 can also be selected. The frequency values presented above are used merely for purposes of illustration, and it should be understood clearly that other frequency values can be selected to achieve different measurement capabilities.

Referring again to FIG. 1, oscillator subsystem 110 generates an oscillator signal whose frequency and phase is very precisely controled by the frequency and phase of a clock signal provided by a very stable signal source 125, such as an atomic clock. Oscillator subsystem 110 employs a phase lock loop or other suitable circuit for generating the oscillator signal.

The oscillator signal provided at the output of oscillator subsystem 110 is provided to an input of a referenced subsystem 112. Reference subsystem 112 provides a plurality of reference signals having the same frequency value as corresponding difference frequency signals and a phase in accordance with the phase of the oscillator signal.

A phase comparator subsystem 114 compares a phase of the difference frequency signals and the fine measurement signal (either upper signal F1 or lower signal F2) with the corresponding reference frequency signals. This phase comparison allows phase comparator subsystem 114 to provide as outputs measurements of the position of the receiving station within the coarse, intermediate and fine lanes discussed above in connection with FIG. 2.

II. Detailed Description of Subsystems and Methods

The following sections present more detailed explanations of the structure and operation and their method of operation of specific subsystems of the present invention. Reference to sections should be made for these more specific details and description, but it should be understood that material already presented is only briefly summarized for purposes of brevity.

A. Front End Subsystem

Figure 3B:
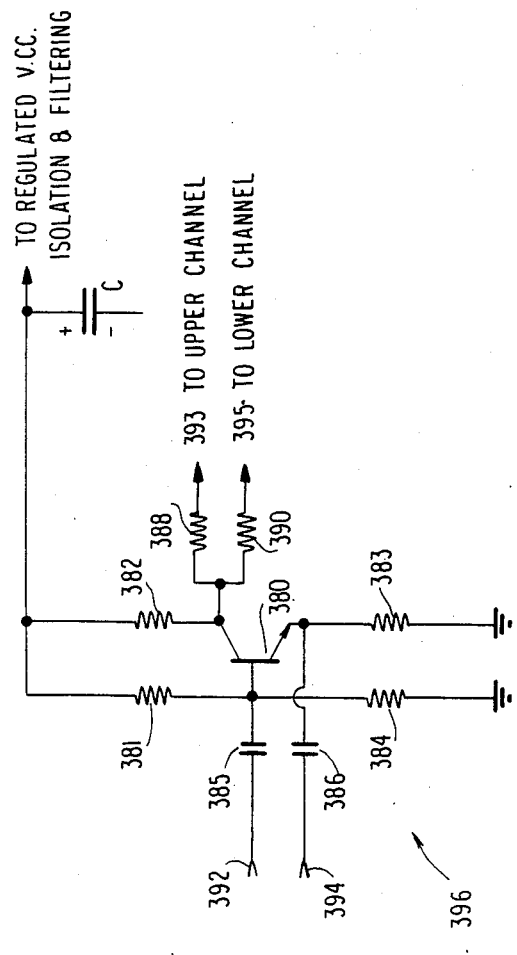
FIG. 3B is a schematic of a preferred embodiment of the mixer of the front end subsystem.
Figure 3A:
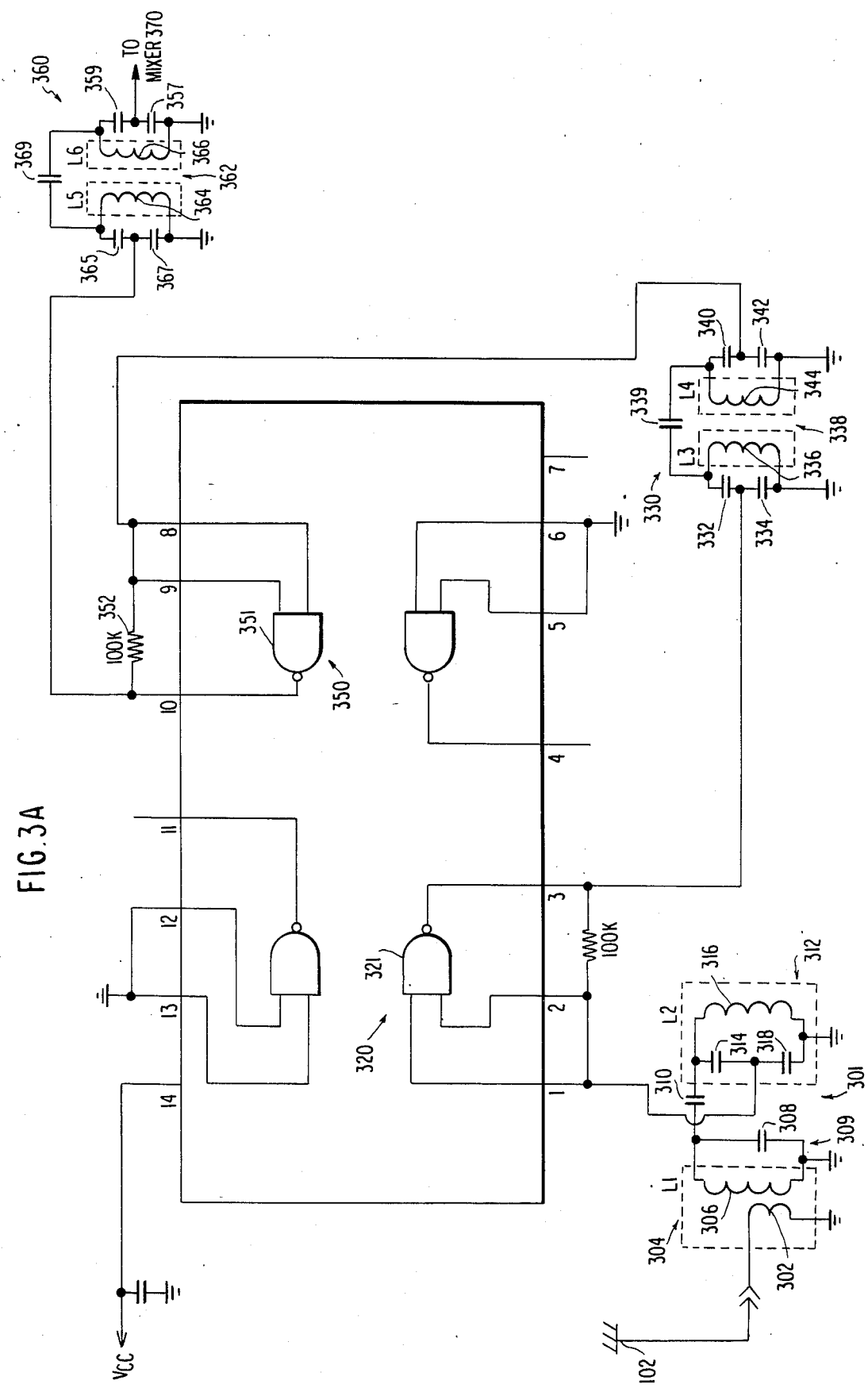
FIG. 3A is a schematic of a preferred embodiment of the preselector and R.F. amplifier of the front end subsystem.

Referring now to FIG. 3A, which is a schematic of a preferred embodiment of the preselector 320 and the R.F. amplifier 350 of the front end 104, antenna 102 provides a signal including upper signal F1 and lower signal F2, to a bandpass stage designated generally by reference numeral 301. Specifically, the signal from antenna 102 is provided to one side of a primary winding 302 of an R.F. transformer designated generally by reference numeral 304. The other side of primary winding 302 is connected to ground. The impedance exhibited by primary 302 is selected to match the impedance exhibited by the antenna 102. A typical impedance value for antenna 102 is 50 ohms.

A secondary winding 306 of transformer 304 is connected in parallel with a capacitor 308 to define a tuned circuit 309. One side of tuned circuit 309 is connected to ground, and the other side is coupled via a capacitor 310 to a tuned circuit designated generally by reference numeral 312. Preferably, tuned circuit 309 is tuned to the high end of the desired passband, which contains the upper signal F1 and the lower signal F2. In contrast, tuned circuit 312 is tuned to the lower end of the desired passband.

Tuned circuit 312 comprises an input side having one side of a capacitor 314 and one side of an inductor 316 connected to one side of capacitor 310 which provides the input passband signals. The other side of capacitor 314 is the output of tuned circuit 312 and is connected to a first side of a capacitor 318. A second side of capacitor 318 and a second side of inductor 316 are connected to ground. It has been found that a small capacitance value is preferable for capacitor 314, while a larger capacitance value should be selected for capacitor 318 in order to provide the desired passband tuning response. The output impedance exhibited by the tuned circuit 312, for example, is in the range of 1M ohms.

The output of tuned circuit 312 is connected to the input of an amplifier, which in the preferred embodiment constitutes a NAND gate 321. Specifically, inputs 1 and 2 of NAND gate 321 (for example, of a quad NAND gate such as a COS MOS 4011A quad NAND gate of conventional design) are supplied with the output of tuned circuit 312. Note that by connecting the output of NAND gate 321 via a feedback resistor having a substantially high impedance value with its pair of inputs, the inventor has found that such a circuit acts as an excellent amplifier which exhibits high gain, stable operation, no appreciable phase distortion, and which is inexpensive to produce. Obviously, any suitable gain or amplifier stage can be employed in lieu of NAND gate 321 or for any of the other amplifying or gain stages in the present invention.

NAND gate amplifying stage 321 forms the core of the preselector stage 320 which amplifies the input R.F. signals (including upper signal F1 and lower signal F2) so that the level of the power output at pin 3 of NAND gate 321 is a precise, constant value irrespective of the level of the input signal provided to pins 1, 2. Note that the AGC $V_{cc}$ signal from the upper channel AGC stage is supplied to pin 14 of the 4011A gain block.

The output at pin 3 of NAND gate amplifying stage 321 (which exhibits a relatively low impedance) is provided to the input of a bandpass tuned circuit stage designated generally by reference numeral 330. Broadly, bandpass tuned circuit 330 filters the output of NAND gate 321 (which includes upper signal F1 and lower signal F2) and isolates NAND gate 321 from the R.F. amplifier 350 which is cascaded with it. Specifically, the input side of the tuned circuit 330 comprises a pair of capacitors 332 and 334 connected in series. The node formed by these two capacitors 332, 334 constitutes the input of tuned circuit 330. The other side of each of the capacitors 332, 334 is connected to respective sides of the primary winding 336 of an R.F. transformer 338. One side of primary winding 336 and the side of capacitor 332 not connected to capacitor 334 constitutes the output of tuned circuit 330, which is coupled via a capacitor 339 to the second half of tuned circuit 330. The value of capacitor 332 is usually selected to be larger than the value of capacitor 334, and the first half of tuned circuit 330, comprising primary winding 336 and capacitors 332 and 334, is tuned, for example, to the low side of the passband which includes upper signal F1 and the lower signal F2 at R.F.

The second half of tuned circuit 330, which is tuned to the high side of the R.F. passband, is coupled by capacitor 339 to the first half of tuned circuit 330. By tuning the second half of the tuned circuit 330 to the high side and tuning the first half to the low side of the passband, the desired bandpass response having a very low amplitude ripple is obtained.

A suitable form for the second half of the tuned circuit 330 comprises a pair of capacitors 340 and 342 connected in series. Series connected capacitors 340 and 342 are connected in parallel with the secondary winding 344 of transformer 338. The input of the second half comprises one side of secondary winding 344 and one side of capacitor 340. The output of the second half comprises the other side of inductor 344 and one side of capacitor 342, which are connected together.

The output of the second half of tuned circuit 330 is connected to the input of the R.F. amplifier gain stage designated by reference numeral 350. Broadly, gain stage 350 amplifies the output of tuned circuit 330, which includes at R.F. the upper signal F1 and the lower signal F2, so that the power output of gain stage 350 is maintained at a precise, constant value irrespective of the level of the input signal from tuned circuit 330. The upper channel AGC stage, which supplies the $V_{cc}$ signal to pin 14 of the 4011A, controls the power output level.

A preferred form for R.F. gain stage 350 is that of a NAND gate 351, which comprises one of the four NAND gates of a CMOS model 4011A discussed above. NAND gate 351 is connected to act as an amplifier by feeding back a resistor 352 to the pair of inputs of the NAND gate 352 (PINs 8 and 9) some of the output signal at PIN 10. Feedback resistor 352 is selected to have a resistance value (e.g. 1 kohm) so that the desired level of amplification is achieved. The output PIN 10 is supplied via a tuned circuit 360 to a first input 392 of a mixer stage 396 (as shown in FIG. 3B) of the front end subsystem 104.

Tuned circuit 360 bandpass filters at R.F. the output of R.F. amplifier 350 (which contains the upper signal F1 and the lower signal F2). It also acts to match the output of gain stage 350 with the first input 392 of the mixer 370. Any suitable form for tuned circuit 360 can be employed which provides these function.

A suitable form for the tuned circuit 360 comprises an R.F. transformer 362 having a primary winding 364 and a secondary winding 366. The primary winding 364 is connected to a pair of capacitors 365, 367 connected in series. The output (PIN 10 of NAND gate 350) from gain stage 350 is provided to the node defined by capacitors 365, 367. The output of the tuned circuit 360, comprising capacitors 365, 367 and inductor 364, is connected via a coupling capacitor 369 to one side of inductor 366 and to one side of a capacitor 359. The other side of capacitor 359, which provides the output signal to mixer 370, is also connected to one side of a capacitor 357. The other side of capacitor 357 is connected to ground. Capacitors 359 and 357 are connected in series across the secondary winding 366. Note that one side of the tuned circuit 360 is tuned to the high end of the desired passband while the other side is tuned to the low end of the passband. In this way, the desired flat passband response is produced by the tuned circuit 360.

As discussed above, the upper channel output of the automatic gain control (AGC) stage (see FIG. 4) is provided to the voltage input terminal 14 of the model CMOS 4011A having the two NAND gates which act as the active devices for stages 320 and 350. The AGC stage controls the level of the voltage $V_{cc}$ provided to pin 14. The value of the voltage produced by the AGC stage is controlled by the value of the input signals provided by the antenna 102. In this way, the AGC controls the amplification produced by stages 320 and 350 so that constant power is provided at their outputs irrespective of the signal level of the input signals. In this way, the AGC stage maintains the power output of each of the active devices at a very precise value. This control significantly eliminates the phase error introduced by amplifying and gain stages in conventional receivers due to the variation in the operating point of the active devices that are employed in these stages. It also allows the present invention to operate over a very wide RSL range since each amplifying and gain stage must only provide an incremental amount of amplification; the sum of these incremental amounts of amplification results in the very great dynamic range of operation that is achieved by the present invention. Note that what is important with these stages is that the amplification be performed without introducing any appreciable phase distortion to each of the pair of signals F1, F2 being amplified.

The output of R.F. amplifier 350 via tuned circuit 360 is provided to first input 392 of mixer stage 396. A second input 394 of mixer stage 396 is provided via an output 804 with a local oscillator (L.O.) signal supplied by the local oscillator subsystem 802 (FIG. 3C; local oscillator subsystem 802 is discussed below). The local oscillator signal has a frequency which is selected so that mixer 396, when it mixes the local oscillator R.F. signal with the signal containing the pair of signals F1, F2, frequency translates signals F1, F2 down to a preselected baseband frequency range. The phase of the local oscillator signal is precisely controlled since it is generated in accordance with a reference signal provided by the oscillator subsystem 110.

Mixer 396 has a first output 393 and a second output 395. First output 393 provides both the upper signal F1 and the lower signal F2 at baseband (along with the other signals in the passband) to an upper channel 401 of filter subsystem 106. Second output 393 provides both the upper signal F1 and the lower signal F2 at baseband (along with the other signals in the passband) to the lower channel 402 of filter subsystem 106. Only upper channel 106 is described here since its operation is identical to that of the operation of the lower channel; any substantial differences between their structure or operation is noted.

B. Local Oscillator Subsystem

Figure 3C:
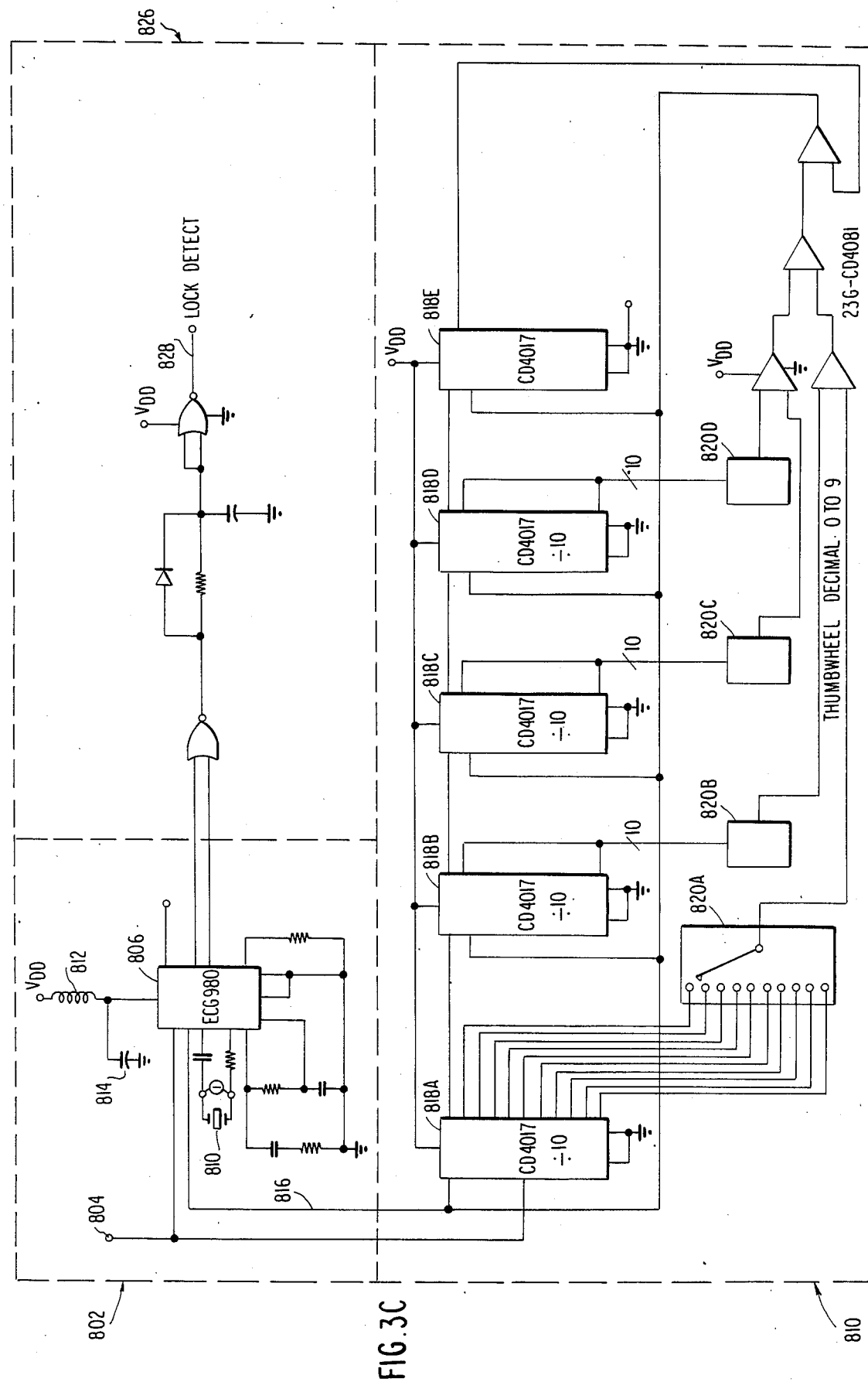
FIG. 3C is a schematic diagram of a preferred embodiment of the local oscillator subsystem which provides the local oscillator signal to the mixers of FIG. 3B for generating the tuning frequencies of the receiving station.

Referring now to FIG. 3C, local oscillator subsystem 802 supplies a local oscillator signal at an output 804 to mixer 396 for tuning the reception of the receiving station. In a preferred embodiment, the local oscillator subsystem 802 comprises a phase lock loop (the core of which is a chip 806, preferrably a model ECG 980 made by Texas Instruments of Dallas, Tex.) driven by a clock signal received at PIN 14 from the precise reference source 125. The output on PIN 4 from chip 806 is supplied to output 804 and also to a frequency divider chain substantially contained in the dashed line box designated by reference numeral 810. As is well known, phase lock loop 808 has a piezoelectric crystal 810 for driving the variable frequency oscillator in chip 806. Supply voltage $V_{DD}$ is supplied to PIN 16 of chip 806 via a low pass filter including inductor 812 and capacitor 814. In essence, chip 806 provides the output signal at PIN 4 which has a frequency determined by the comparison of the clock signal on PIN 14 and the signal on PIN 3 fed back from the frequency divider chain 810.

Frequency divider chain 810 digitally divides by a divisor selected by the user the output signal supplied by PIN 4 of chip 806. This digital divisor produces the feedback signal on line 816 having a value in accordance with the divisor selected by the user. This feedback signal, which is compared by chip 806 with the clock signal on PIN 14, very precisely controls the frequency value of the local oscillator output signal provided by PIN 4. In this way, the user can select the frequency at which the receiving station 101 is tuned.

Frequency divider chain 810 preferably comprises a plurality of divide by N counters 818A to 818E connected in cascade. A preferable form for counters 818A to 818E is a model CD 4017 chip manufactured by Motorola, Inc. of Phoenix, Ariz. The divisor used by each counter 818A to 818D is set by a respective switch 820A to 820D (preferably of the thumbwheel variety). In operation, the frequency divider chain 810 provides an output pulse on line 816 each time the pulses of the input signal to PIN 14 of divider 818A reaches the digital count set by switches 820A to 820D. In this way, the frequency of the digital signal fed back to PIN 3 of chip 806 can be precisely controlled by the user. It should be understood that other approaches to achieve the digital division of the feedback signal can be used.

A lock detect circuit 826 substantially contained in the dashed line box designated generally by reference numeral 826 is connected to PINS 1 and 2 of chip 806 to provide an indication on an output 828 of when the phase lock loop is in the lock mode. This informs the user that the receiving station 101 is actually tuned to the desired frequency.

C. Filter Subsystem

Figure 4A:
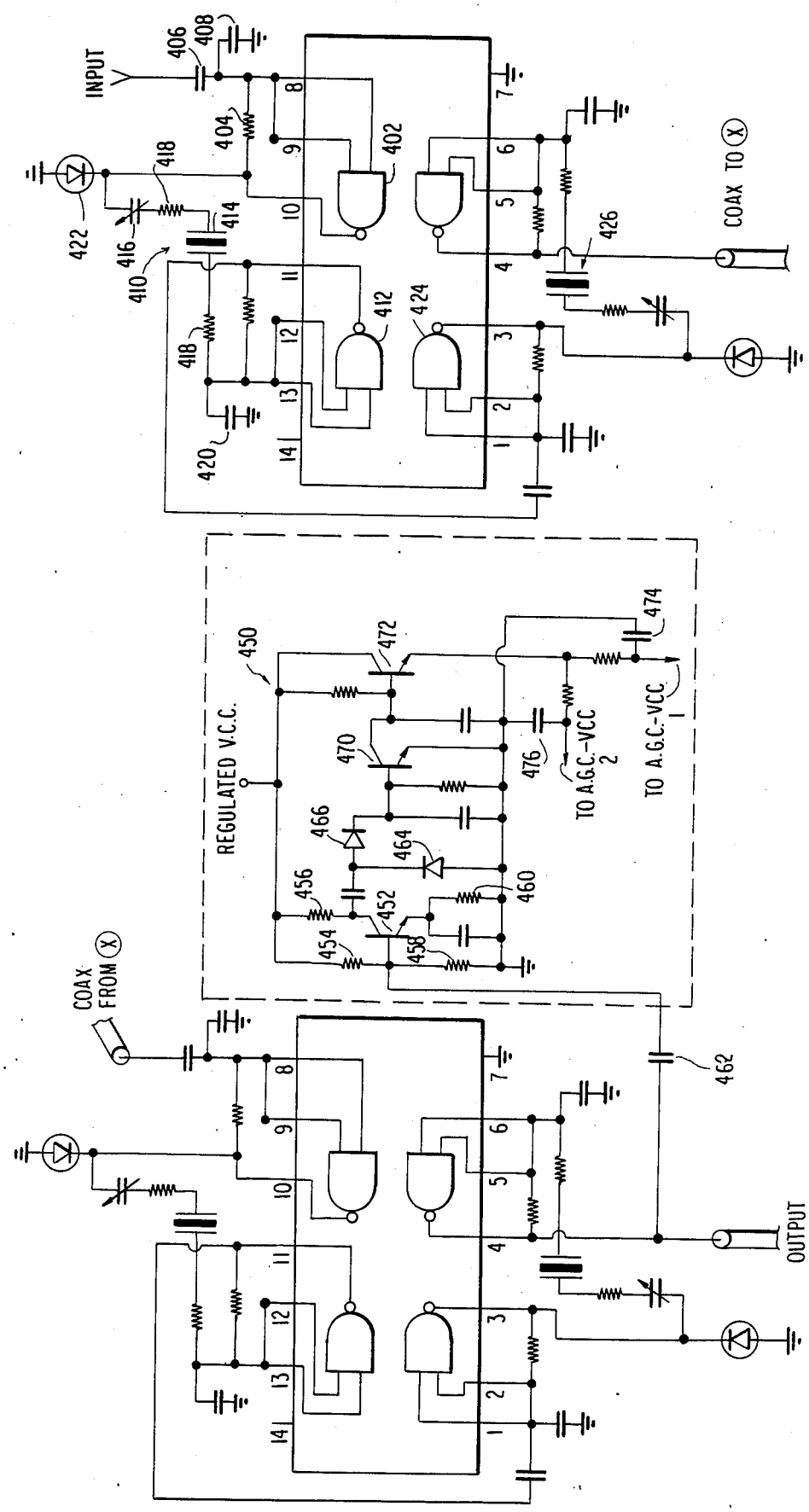
FIG. 4A is a schematic of an embodiment of the upper channel of the filter subsystem used to extract the upper signal F1 by bandpass filtering at baseband.
Figure 4B:
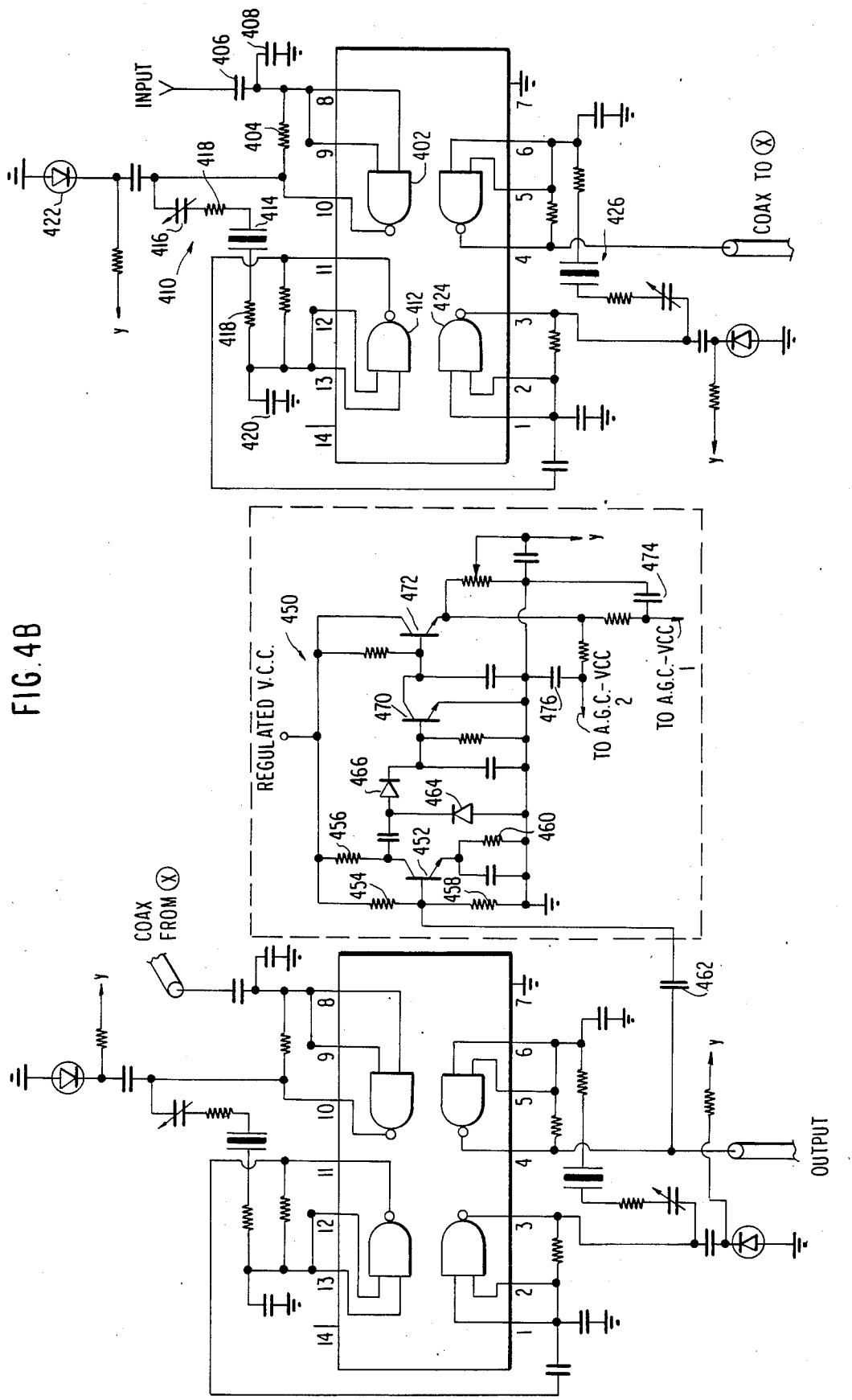
FIG. 4B is a schematic of a preferred embodiment of the upper channel of the filter subsystem used to extract the upper signal F1 by bandpass filtering at baseband.
Figure 4C:
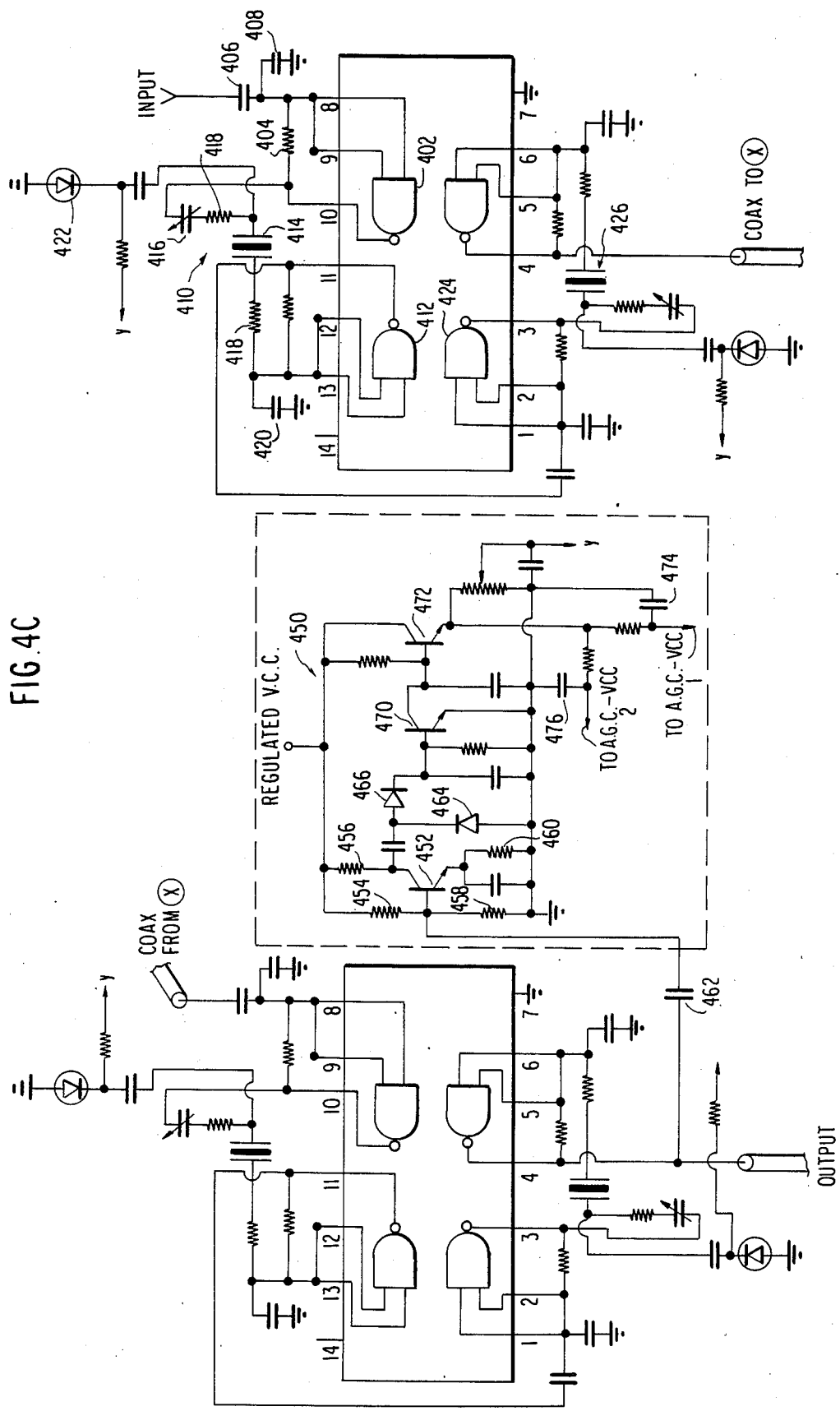
FIG. 4C is a schematic of an embodiment of the upper channel of the filter subsystem used to extract the upper signal F1 by bandpass filtering at baseband.

Filter subsystem 106 extracts the upper signal F1 and the lower signal F2 at baseband from the other signals contained in the passband they occupy. FIGS. 4A, 4B and 4C show three embodiments for filter subsystem 106. The embodiment shown in FIG. 4A is discussed first. Only the differences between the embodiments shown in FIGS. 4B and 4C from the embodiment shown in FIG. 4A are noted in the discussion of these embodiments.

Broadly, filter subsystem 106 has an upper channel 401 and a lower channel 402. Baseband signals within the passband, including upper 401 signal F1 and the lower signal F2, are provided to the upper channel and are provided to the lower channel 402 by the mixer 396. Upper channel 401 filters out (or extracts) the upper signal F1 from the other signals that occupy the passband so that upper signal F1 can be used by the lane expansion subsystem 108 to generate the plurality of difference frequency signals. Similarly, lower channel 402 acts to filter out (or extract) the lower signal F2, which is also used by the lane expansion system 108 to generate the plurality of difference frequency signals.

As noted above, FIGS. 4A, 4B and 4C show three embodiments of circuits that can be utilized for either the upper channel 401 or the lower channel 402 of filter subsystem 106.

In the explanation that follows, reference is made to the upper channel 401 of filter subsystem 106. It can be assumed unless noted otherwise that lower channel 402 utilizes the same structure and functions in substantially the same manner as that of the upper channel 401. For purpose of brevity, only upper channel 401 is described in detail.

Referring now to the embodiment of filter subsystem 106 shown in FIG. 4A, the output 393 of mixer 396 (FIG. 3B) is connected to a gain stage 402. Note that any suitable form for gain stage 402 which produces the desired level of amplification of an input signal can be employed. A preferred form for gain stage 402 and the other gain and amplification stages of filter subsystem 106 is a NAND gate (of a quad NAND gate of a model CMOS 4011A) connected in an amplifier configuration by feeding back part of its output to its inputs.

Gain stage 402 amplifies the signals present in the passband by a amount determined by the value of resistor 404 connected between its output (PIN 10) and its pair of inputs (PINS 8 and 9) and by the level of the $V_{cc}$ signal provided to PIN 14 supplied by the upper channel AGC stage 405. A coupling capacitor 406 couples the inputs of gain stage 402 to resistor 388 of the mixer 370 (FIG. 3C), and acts to isolate gain stage 402 from mixer 370. A capacitor 408 is connected to ground.

The output of gain stage 402 is connected to a tuned circuit having a center frequency equal to a frequency of the upper signal F1. The tuned circuit, designated generally by reference numeral 410, provides its output to the input of a gain stage 412.

A preferred form for filter 410 includes a piezoelectric quartz crystal 414. Quartz crystal 414 preferably is a single discrete filter element, exhibiting, for example, a capacitance value of 5 pf at resonance and an internal resistance in the range of 1,200 ohms. The center frequency of crystal 414 is substantially equal to the frequency of the upper signal F1. A variable capacitor 416 in series with a resistor 418 provides the output of gain stage 402 to one side of the crystal 414. Resistor 418 acts as an isolation resistor for matching the internal resistance exhibited by the crystal. The capacitor 416 allows the center frequency of the tuned circuit to be adjusted so that it is equal to the frequency of the upper signal F1. The other side of the crystal 414 is connected via a resistor 418 to the inputs of the gain stage 412. A capacitor 420 is connected between these inputs and electrical ground.

A varactor diode 422 of conventional design is connected in the embodiment of FIG. 4A between electrical ground and one side of the variable capacitor 416. Varactor diode 422 exhibits a capacitance-to-voltage characteristic which allows it to counter exactly the capacitance-to-voltage characteristic exhibited by crystal 414 of tuned circuit 410. In other words, varactor 422 cancels out exactly the change in capacitance exhibited by the crystal 414. Any change in the voltage provided by the output of the gain stage 402 due to changes in amplification due to control by the upper channel AGC stage 450 (discussed below) is eliminated by the varactor diode 422. The varactor diode 422 thus eliminates any phase distortion caused to the upper signal F1 due to changes in capacitance exhibited by crystal 414. In this way, filter subsystem 106 does not introduce any phase error into the signal processing of the upper signal F1 due to changes in the voltage applied to the crystal 414. The inventor has found that this results in a significant improvement in eliminated of phase error or distortion associated with the filtering of the upper signal F1 from the other signals occupying the passband.

Gain stage 412 is identical to gain stage 402 in structure and in operation. It acts to amplify the filtered signal by a preselected amount irrespective of the signal level provided to its input. The power output at the output of gain stage 412 is maintained constant by the operation of the upper channel AGC stage 450 irrespective of the value of the input signal provided to it by the filter 410.

The output of gain stage 412 is provided to the input of a gain stage 424. Gain stage 424 is substantially identical to gain stage 402 in that it provides a constant power output irrespective of the level of the signal provided to its input. The output of gain stage 424 is connected to a second filter designated generally by reference numeral 426. Filter 426 has a structure and operation substantially identical to that of filter 410, and thus is not described in detail here.

It should be understood that by providing a filter stage between two gain stages and isolating these gain stages with the succeeding pairs of gain stages and filter stages, the desired isolation between stages is achieved by the present invention. Further, by providing only a limit amount of gain at each stage in the filtering operation (where the amount of gain is well within the line or region of operation of the active device that is employed), the present invention can maintain phase integrity constant over a very wide dynamic RSL range since each of these gain stages allows a preselected amount of gain to be employed. The use of a single gain stage would not be able to produce the desired very wide dynamic RSL range of operation without introducing significant phase distortion due to the wide frequency range over which such a single stage would have to operate.

As shown in FIG. 4A, four filters are employed in the upper channel 401. Similarly, eight gain stages are utilized with these four filters. It should be understood, however, that any number of gain stages and filter stages can be employed as long as the desired limited amplification at each stage is employed and varactor diodes are utilized with each of the filter stages to cancel out capacitance changes due to variations in the voltage applied to the filter elements.

A preferred embodiment of an isolation amplifier 902 used to amplify and buffer the signal from the last active device in the upper channel 401 and the input of the first channel of the lane expansion subsystem 108 is shown in schematic form in FIG. 4D. The output signal from the last active device of the upper channel 401 is supplied to the pair of inputs (PINs) 12 and 13 of a NAND gate 904 connected in an amplifying configuration (with a feedback resistor connected between its pair of inputs and its output). A coupling capacitor 906 isolates the output of the last active device of the upper channel 401 from the pair of inputs to the NAND gate 904. As discussed above, a preferred form for NAND gate 904 is a CMOS model 4011A.

The output of the NAND gate 904 (PIN 11) is supplied via a coupling capacitor 908 to the pair of inputs of a NAND gate 910 connected in amplifier configuration. Again, a feedback resistor 912 supplies a portion of the output (PIN 4) back to the inputs (PINs 5 and 6 to produce the desired amplification). The output of the isolation amplifier 902 is provided on a line 914 and is supplied to the first channel of the lane expansion subsystem 108.

Significant additional signal isolation is achieved by the isolation amplifier 902 because NAND gate 904 is physically and electrically isolated from NAND gate 910 because the CMOS model 4011A employs a pair of discrete substrates. NAND gate 904 is on one of these substrates and NAND gate 910 is on the other. In this way, this high degree of physical and electronic isolation is achieved.

In addition to acting as a buffer between the upper channel 401 and the first channel of the lane expansion subsystem 108, the isolation amplifier 902 also provides additional control of the power level of the signals being processed by the receiving station. Specifically, the upper channel AGC stage 450 via a potentiometer 916 (which allows the amplification range of the amplifier to be controlled) controls the value of the $V_{cc}$ so that the power output of the isolation amplifier 902 is maintained constant irrespective of the level of the input signal provided to NAND gate 904. The use of the variable resistor 916 allows the isolation amplifier 902 to introduce more gain into the receiving station when it is needed in a given application or, conversely, to introduce less gain when it is not needed. Obviously, in certain applications the level of gain that is needed by the receiving station will be different from other applications. The isolation amplifier 902 provides this capability as well.

The upper channel automatic gain control (AGC) stage 450 of the present invention is shown in the embodiment of the upper channel 401 of the filter subsystem 106 shown in FIG. 4A. As discussed above, upper channel AGC stage 450 in response to the received signal level (RSL) of the received signals F1, F2 maintains the power output constant of the active devices of the preselector 320 and R.F. amplifier 350 stages of the front end subsystem 106, the gain stages of the filter, and the isolation amplifier stage 902 of the filter subsystem 106. A comparable AGC circuit is utilized in the lower channel of filter subsystem 106, but it only controls the active devices in the lower channel; in other words, the active devices in the front end subsystem 104 are controlled by the AGC system 450 of the upper channel 401.

Any suitable form for the upper channel AGC subsystem 450 can be employed which produces a variation in the supply voltage ($V_{cc}$) provided the active devices in accordance with the signal level of the upper signal F1 so that the level of power output of each active device is maintained precise and constant.

A preferred embodiment of the upper channel AGC subsystem 450 employs a first amplifying stage having a NPN transistor 452 connected in a common emitter configuration. Biasing resistors 454, 456, 458, and 460 have values selected to operate transistor 452 in its active amplifier range. The output of the last gain stage of the upper channel 401 is supplied by an isolation capacitor 462 to the base of the transistor 452.

The output of transistor 452 is supplied to the input of a half-wave voltage doubler rectifier stage comprising a diode 464, a diode 466, and a smoothing capacitor 468. Diodes 464 and 466 are connected so as to provide only the positive half of the voltage doubler signal to the smoothing capacitor 468. Capacitor 468 rectifies the voltage doubled signal from the doubler diodes 464, 466 and provides the smoothed voltage as an input to the base of a D.C. control transistor 470 connected in a common emitter configuration. The output at the collector of transistor 470 is proportional to the value of the input voltage present at its base; the output reflects the level of the rectified voltage doubled signal. The output signal is supplied as an input to the base of a NPN transistor 472 connected in an emitter follower, voltage regulator configuration. Transistor 472 provides an output at its emitter to charging capacitors 474, 476. The value of the voltage present across charging capacitors 474 and 476 is regulated by voltage regulator transistor 472 so that they are directly proportional to the value of the received signal level. In other words, an increase in the RSL level of the received signals will cause a decrease in the value of the voltage present across charging capacitors 474, 476. Similarly, a decrease in the RSL level will cause a decrease in the value of the voltage present across charging capacitors 474, 476. In this way, the upper channel AGC subsystem 450 controls voltage level of the $V_{cc}$ provided to the amplifying and gain stages. This results in the gain of the active devices being regulated so that the power output of each device is maintained constant over a very wide RSL range.

D. Lane Expansion Subsystem

Figure 5:
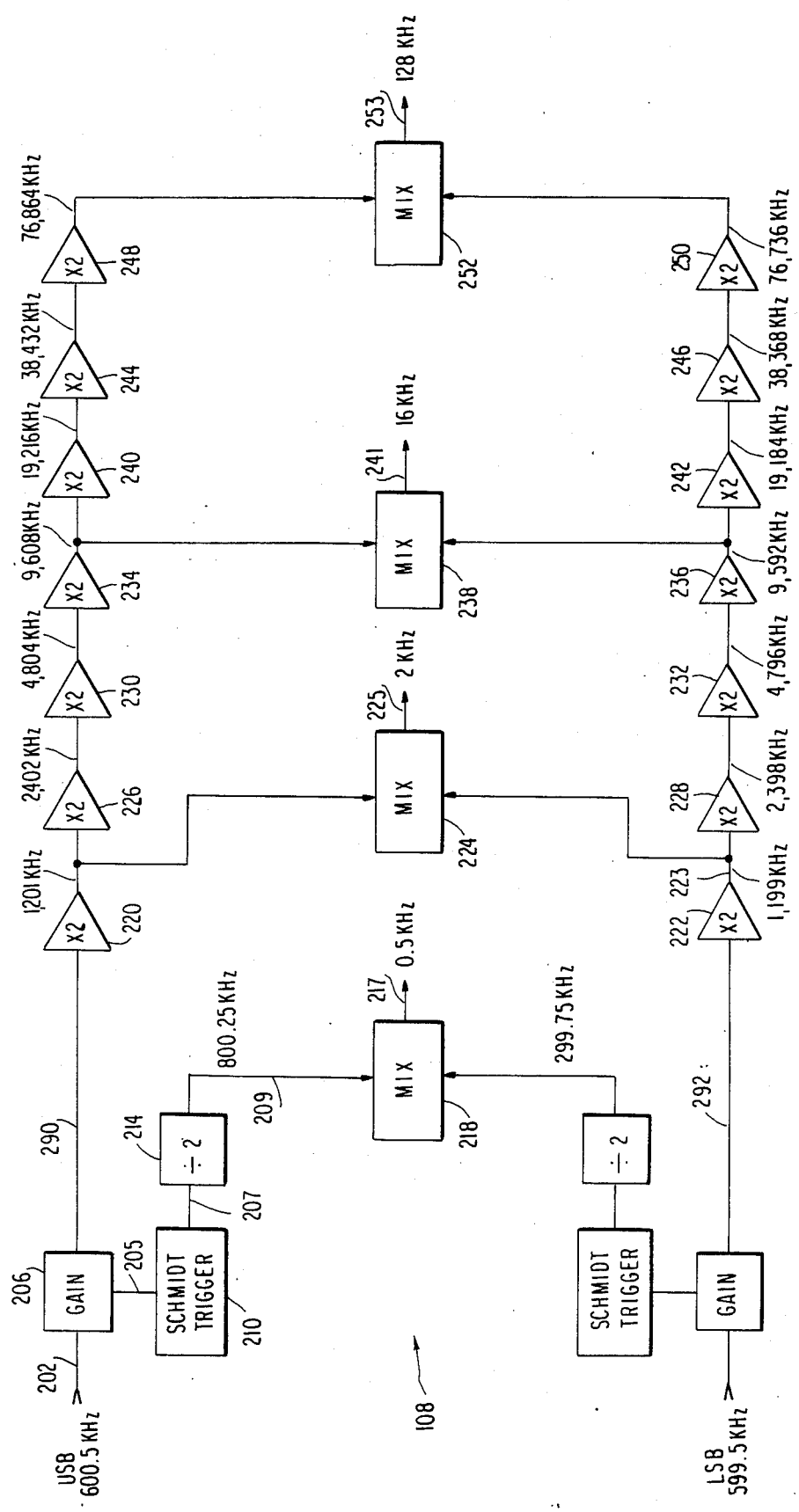
FIG. 5 is a schematic of a preferred embodiment of the lane expansion subsystem having a first channel and a second channel used to generate the plurality of difference frequency signals from the received pair of signals at baseband.

A preferred embodiment of a version of the lane expansion subsystem 108 which produces the four difference frequency signals used in the illustrative example is shown in block diagram form in FIG. 5. It should be understood that the number of difference frequency signals that can be produced by the lane expansion subsystem 108 of the present invention can be selected in accordance with a specific measurement application. Further, the frequency value of the individual difference frequency signals can be adjusted by adjusting the delta frequency between the pair of signals F1, F2. The values presented in connection with FIG. 5 are merely for purposes of illustration, and it should be understood clearly that they should not be construed as limiting factors to the scope of the invention.

The upper signal F1 at baseband is supplied by the isolation amplifier 902 to the first channel designated generally by reference numeral 290 of the lane expansion subsystem 108. Similarly, the lower signal F2 at baseband is supplied by another isolation amplifier to the second channel designated generally by reference numeral 292 of the lane expansion subsystem 108. For purposes of illustration, the upper signal F1 has a frequency of 600.5 KHz, and the lower signal F2 at baseband has a frequency of 599.5 KHz. Note that this means that the delta frequency at R.F. between the signal pair F1, F2 is 1 KHz.

The first channel at the input 202 supplies the upper signal F1 at baseband to the input of a gain stage 206 of conventional design. Gain stage 206 acts to isolate the first channel 290 from the isolation amplifier 902. One of the two outputs 205 of the gain stage 206 is supplied to the input of a Schmitt trigger stage 210 of conventional design. The Schmitt trigger, which detects zero crossings, produces an output digital signal on a line 207 which essentially is a squared up version of the input signal. This squared up signal on line 207 is supplied to a divide-by-2 counter 214 of conventional design, which supplies on an output line 209 a squared up version of the signal F1 having a frequency of 300.25 KHz.

The lower channel 292 also produces a squared up version of the lower signal F2 having frequency of 299.75 KHz using identical stages to the stages discussed above in connection with the first channel 290. The upper signal F1 (having a frequency of 300.25 KHz) and the lower signal F2 (having a frequency of 299.75 KHz) are supplied to the inputs of a mixer 218 of conventional design. Mixer 218 preferably is a digital mixer. Mixer 218 at its output 217 provides the first difference frequency signal. In the illustrative example, the first difference frequency signal has a frequency value of 0.5 KHz. Note that by using the divide-by-2 approach, the lane expansion amplifier of the present invention can produce a difference frequency signal from the received signal pair (F1, F2) which has a frequency which is less than the delta frequency. Because the frequency is less than the delta frequency, the lane defined by the first difference frequency signal is greater than the lane that would be defined if the division had not been performed. It can therefore be appreciated that the lane expansion subsystem 108 of the present invention can also produce lanes that have lengths which are longer than a lane defined by the delta frequency as well as producing lanes that are shorter than that defined by the delta frequency. In other words, the lane expanison subsystem of the present invention can produce lanes of a desired length for a given measurement application.

The second difference frequency signal is generated by the lane expansion subsystem 108 of the present invention in the following fashion. The upper signal F1 (having a frequency of 600.5 KHz) is frequency doubled by a linear expansion amplifier stage 220. Similarly, the lower signal F2 is frequency doubled by an identical linear expansion amplifier 222. A suitable form for these linear expansion amplifiers 220, 222, as well as the other linear expansion amplifiers utilized by the lane expansion subsystem 108, is that shown in U.S. Pat. No. 3,681,705 to Spence, which is incorporated explicitly by reference into this application. As is discussed in the Spence patent, the linear expansion amplifier not only doubles the frequency of the input signal, but also doubles the phase in a very precise and exact manner. The doubling of the frequency and phase does not introduce any phase error which is normally the case when a signal is frequency doubled in conventional amplifiers. The reasons for these errors are discussed in greater detail in the Spence patent.

The output of the linear expansion amplifier 220 is a frequency doubled version of the upper signal F1 provided by the gain stage 206. Similarly, the signal provided at the output of the linear expansion amplifier 222 on a line 223 is a frequency doubled version of the lower signal F2 supplied by gain stage 208. These two signals are supplied to a mixer 224 of conventional design, which produces at its output 225 the second difference frequency signal. Preferably, mixer 224 is an analog mixer. Because the frequency doubled version of the upper signal F1 has a frequency of 1,200 KHz and the frequency doubled version of the lower signal F2 has a frequency of 1,199 KHz, the second difference frequency signal has a frequency value of 2 KHz.

The second difference frequency signal is produced by frequency doubling three times (using the linear expansion amplifier stages 226, 230 and 234) the frequency doubled version of the upper signal F1, and also by frequency doubling three times (using linear expansion amplifier stages 228, 232 and 236) of the frequency doubled version of the lower signal F2. This results in a version of the upper signal F1 having sixteen times the frequency of the upper signal F1 at baseband and also producing a version of the lower signal F2 having a frequency which is sixteen times the frequency of the lower signal F2 at baseband. These two signals are provided to a mixer 238 of conventional design, which provides at its output 241 the third difference frequency signal. A third difference frequency signal, for example, has a frequency value of 16 KHz.

The fourth difference frequency signal is produced in a manner analogous used to produce the third and second difference frequency signals. Frequency doublers 240, 244, and 248 multiply the output of doubler 234 8 times. Frequency doublers 242, 246, and 250 multiply the output of doubler 236 8 times. The outputs of amplifiers 248 and 250 are supplied to mixer 252. Mixer 252 provides at its output 253 the fourth difference frequency signal having a value, for example, of 128 KHz.

Note that the present invention can employ either the upper signal F1 or the lower signal F2 either at baseband or another frequency to produce the desired fine lane measurement. Reference is made in this regard to the patents incorporated by reference above which show systems which provide such a fine lane measurement capability.

The first difference frequency signal, second difference frequency signal, third difference frequency signal, fourth difference frequency signal, and the signal used to generate the fine lane are provided by the lane expansion subsystem 108 via lines 113, 115, 117, 119, for example, to the phase comparator subsystem 114.

E. Reference Subsystems

The reference subsystem 112 shown in block diagram form in FIG. 6 generates in accordance with the oscillator signal on line 121 from the oscillator subsystem 110 the plurality of reference signals used for the phase comparison with the plurality of difference frequency signals provided by the lane expansion subsystem 108. It should be understood that other approaches can be utilized to generate the plurality of reference signals in accordance with the clock signal from the precise reference source or in accordance with the oscillator signal generated in accordance with the clock signal. The embodiment shown in FIG. 6, however, provides very precise reference signals, and also provides the capability of a cycle-by-cycle incrementation of the pulse trains that make up the plurality of reference signals.

As shown in block diagram form in FIG. 1, the precise reference source 125, which preferably is an atomic clock of conventional design, supplies a clock signal of a very precise frequency and phase to an oscillator subsystem 110. The frequency of the clock signal is preselected so that other signals generated using it will have desired frequency values. The phase of the clock signal is calibrated with respect to the phase of a corresponding clock signal at the transmitting station. It is important to understand that this phase calibration must be performed since the measurement capability of the receiving station is dependent upon the generation of the plurality of reference signals having a phase of a known relationship with respect to the phase of the clock signal at the transmitting station used to synthesize the transmitted pair of signals F1, F2. Long term stability with respect to phase and frequency of the clock signal is needed to ensure that the phase measurements will be accurate over time.

The oscillator subsystem 110 generates an oscillator signal on a line 121 in accordance with the clock signal generated by the precise reference source 125. Any suitable circuit and method can be employed in oscillator subsystem 110 to generate the oscillator signal.

Referring now to FIG. 6, the oscillator signal on line 121 is supplied to an input 302 of the reference subsystem 112. A Schmitt trigger circuit 334 of conventional design receives the oscillator signal and squares it so as to produce a digital output version thereof. The digital output signal from the Schmitt trigger 334 is supplied to the input of a divide-by-5 counter 336 of conventional design.

A representative frequency value for the oscillator signal is 500 KHz. Thus, the output on a line 337 from the divide-by-5 counter 336 has a frequency of 1,000 KHz. The signal on line 337 is supplied to the input of a divide-by-5 counter 338 of conventional design, which provides on a line 339 a square wave signal having a frequency of 200 KHz. This signal is provided to the input of a divide-by-5 counter 340 of conventional design, which supplies at its output on a line 341 a square wave signal having a frequency of 40 KHz. This 40 KHz signal is supplied to the input of a divide-by-5 counter 342 of conventional design which provides on a line 343 a square wave signal having a frequency of 8 KHz. The 8 KHz signal on line 343 is supplied to the first input of a comparator 344 of conventional design.

The second input of comparator 344 is provided with a feedback signal having a frequency of 8 KHz provided by a divide-by-2 counter 316 on a line 317. The signal on line 317 is generated by a divider chain which is supplied with an input signal from mixer 304 that is part of a phase lock loop circuit. The difference signal produced by comparator 344 in accordance with the comparison of the two 8 KHz signals provided to it at its inputs is indicative of the error between these two signals. This control signal is supplied via a line 344 to the control input of a variable frequency crystal oscillator 306 of conventional design. Variable frequency oscillator 306 provides an output signal on a line 307 having a nominal frequency, for example, of 5,128 KHz. The mixer 304 in addition to being supplied with the signal on line 307 is also supplied with the 5,000 KHz signal from input 302. The difference frequency signal between the signal on line 307 and the signal from input 302 is supplied by mixer 304 at its output to a line 305. In normal operation, this signal has a frequency of 128 KHz. This signal on line 305 is provided to a buffer 308 of conventional design which supplies it as one of the reference frequency signals (for phase comparison, for example, with the fourth difference frequency signal). In addition, the signal on line 305 is supplied to a divide-by-2 counter 310 of conventional design, which supplies on a line 311 a signal having a frequency of 64 KHz. This 64 KHz signal is supplied to a divide-by-2 counter 312 of conventional design, which provides on a line 313 a signal having a frequency of 32 KHz. The 32 KHz signal is supplied to a divide-by-2 counter 314 of conventional design which supplies on a line 315 a signal having a frequency of 16 KHz. This 16 KHz signal is supplied to a buffer 316 of conventional design which furnishes this as one of the reference signals (for phase comparison with, for example, the third difference frequency signal). The 16 KHz signal is also supplied to a divide-by-2 counter 316 of conventional design, which provides on line 317 the 8 KHz signal, which in addition to being supplied to one of the inputs of comparator 344 is also supplied to a divide-by-2 counter 318 of conventional design. Divide-by-2 counter 318 supplies on a line 319 a signal having a frequency of 4 KHz. This 4 KHz signal is supplied to a divide-by-2 counter 320, which supplies on a line 321 a 2 KHz signal to a buffer 322. Buffer 322, of conventional design, supplies the 2 KHz signal as one of the reference signals (for phase comparison, for example, with the second difference frequency signal). Divide-by-2 counters 322 and 324 in cascade connection are used to generate the 0.5 KHz signal supplied by buffer 326 as one of the reference signals (for phase comparison, for example, with the first difference frequency signal). Finally, divide-by-2 counters 328 and 330 in cascade fashion provide a signal having a frequency of 125 cycles which is fed back to the divide-by-5 counter 336.

The feedback of the output of the divide-by-2 counter 330 at the end of the divider chain allows control of the division of the divide-by-5 counter through the use of a pair of switch-selectable capacitors. Capacitor 380 has a relatively small capacitance value to introduce a short duration pulse, effectively adding one count to the pulse train. Capacitor 382 has a larger relative capacitance value to introduce a one pulse delay, thereby effectively removing due count from the pulse train received from the divide-by-2 counter 330. In the preferred embodiment, capacitors 380 and 382 operated at 125 Hz. Capacitors 380 and 382, when selectively switched in the circuit, allow the reference subsystem 112 to increment back or forward one entire pulse in the clocking sequence. In this way, very precise control of the reference signals can be accomplished by the present invention.

E. Phase Comparator Subsystem

Referring again to FIG. 1, it is seen that the phase comparator subsystem 114 receives the plurality of difference frequency signals and the plurality of reference signals and performs the phase comparison to produce the coarse lane, the intermediate lanes and the fine lanes that are produced by the receiving station of the present invention. As has been discussed in detail above, the phase of each difference frequency signal is compared with the phase of a corresponding reference signal (having the same frequency as the difference frequency signal, but having a phase corresponding to the phase of the precise reference source at the transmitting station) to produce an indication of the position of the receiving station in the lane defined by the frequency of the difference frequency signal. Because at least three measurement lanes are employed by the present invention, even though only a pair of signals F1, F2 are transmitted by the transmitting station, the receiving station of the present invention can zero in on its actual position with respect to the transmitting station. Normally, several different measurement lanes are employed in order to achieve the desired measurement accuracy and real time capability.

It should be understood that any suitable form of phase comparison can be employed by the phase comparator subsystem 114 to provide the output data indicative of the phase relationships in the various lanes that are defined by the difference frequency signals. Both analog and digital techniques can be employed. Further, it should be understood that the phase information that is provided by the phase comparator subsystem 114 can be supplied to further utilization or computing equipment or methods to allow position and/or distance measuring computations to be performed. The receiving station of the present invention can be integrated into existing distance and position measuring systems which provide analysis and other capability based on the raw position measuring information.

One approach for displaying the phase comparison information is to provide a plurality of analog meters whose reading is in proportion to the position of the receiving station relative to the transmitting station. The meters can be arranged (not shown) in such a fashion that the user can determine very quickly the position of the receiving station relative to the transmitting station by the position of the meter indicators. Digital readout may not be preferable in some applications since the analog meters provide a certain amount of damping which will produce superior results since the fine measurements will not cause any appreciable "jitter" on the output of the fine lane meter.

Obviously, numerous modifications and variations of the present invention are possible in light of the above teachings. It is therefore to be understood that, within the scope of the appended claims, the invention may be practiced otherwise than as specifically described herein.

What is claimed is:
1. Apparatus, comprising:
(A) transmitting means for transmitting a first signal and a second signal which are precisely displaced in frequency;
(B) receiving means comprising,
  (1) front end means for receiving said first signal and said second signal, for heterodyning to baseband said first signal to produce a baseband first signal, and for heterodyning to baseband said second signal to produce a baseband second signal;
  (2) filter means, responsive to said front end means, for filtering using a first channel said baseband first signal to produce a filtered first signal, and for filtering using a second channel said baseband second signal to produce a filtered second signal;
  (3) lane expansion means, responsive to said filter means, for generating at least a first difference frequency signal and a second difference frequency signal in accordance with said filtered first signal and said filtered second signal, said first difference frequency signal produced by mixing said filtered first signal and said filtered second signal, said second difference frequency signal produced by frequency multiplying said filtered first signal by a factor of n (where n is a positive integer of 2 or greater) to provide a first multiplied signal, by frequency multiplying said filtered second signal by said factor n to provide a second multiplied signal, and by mixing said first multiplied signal and said second multiplied signal;
  (4) oscillator means for generating an oscillator signal;
  (5) reference means, responsive to said oscillator means, for generating at least a first reference signal having the frequency of said first difference frequency signal and a second reference signal having the frequency of said second difference frequency signal in accordance with said oscillator signal; and (6) phase comparator means, responsive to said reference means, for comparing the phase of said first difference frequency signal with the phase of said first reference signal, and for comparing the phase of said second difference frequency signal with the phase of said second reference signal, whereby the distance of said receiving means from said transmitting means can be determined.

* * * * *